United States Patent
Liu et al.

(10) Patent No.: US 10,417,605 B1
(45) Date of Patent: Sep. 17, 2019

(54) COURIER NOTIFICATIONS REGARDING MISSING ITEMS

(71) Applicant: Square, Inc., San Francisco, CA (US)

(72) Inventors: Xingjie Liu, Mountain View, CA (US); Jevin Bhorania, San Mateo, CA (US)

(73) Assignee: Square, Inc., San Francisco, CA (US)

( * ) Notice: Subject to any disclaimer, the term of this patent is extended or adjusted under 35 U.S.C. 154(b) by 685 days.

(21) Appl. No.: 15/078,837

(22) Filed: Mar. 23, 2016

Related U.S. Application Data

(60) Provisional application No. 62/301,228, filed on Feb. 29, 2016.

(51) Int. Cl.
| | |
|---|---|
| *G06Q 30/00* | (2012.01) |
| *G06Q 10/08* | (2012.01) |
| *G06Q 30/06* | (2012.01) |
| *G08B 21/24* | (2006.01) |

(52) U.S. Cl.
CPC ..... *G06Q 10/0835* (2013.01); *G06Q 10/0838* (2013.01); *G06Q 30/0635* (2013.01); *G08B 21/24* (2013.01)

(58) Field of Classification Search
CPC .................................. G06Q 30/06–08
USPC .................................. 705/26.1–27.2
See application file for complete search history.

(56) References Cited

U.S. PATENT DOCUMENTS

| | | | |
|---|---|---|---|
| 6,675,153 B1 | 1/2004 | Cook et al. | |
| 8,275,359 B2 | 9/2012 | Drennan | |
| 2009/0266722 A1 | 10/2009 | Rogers et al. | |
| 2011/0320034 A1 | 12/2011 | Dearlove et al. | |
| 2013/0132140 A1 | 5/2013 | Amin et al. | |
| 2014/0129951 A1 | 5/2014 | Amin et al. | |
| 2014/0149269 A1* | 5/2014 | Kantarjiev | G06Q 10/083 705/34 |
| 2014/0188750 A1 | 7/2014 | Seiler | |
| 2015/0120602 A1 | 4/2015 | Huffman et al. | |
| 2016/0063435 A1 | 3/2016 | Shah et al. | |
| 2016/0071050 A1 | 3/2016 | Kaye | |
| 2016/0223345 A1 | 8/2016 | Thakur et al. | |
| 2016/0232489 A1 | 8/2016 | Skaaksrud | |
| 2016/0328781 A1* | 11/2016 | Patel-Zellinger | G06Q 30/0635 |
| 2017/0046644 A1 | 2/2017 | Zhang et al. | |
| 2017/0116570 A1 | 4/2017 | Schroeder et al. | |

(Continued)

FOREIGN PATENT DOCUMENTS

| | | |
|---|---|---|
| WO | 01/11523 A1 | 2/2001 |
| WO | 2015/164264 A1 | 10/2015 |

OTHER PUBLICATIONS

Non-Final Office Action dated Mar. 8, 2018, for U.S. Appl. No. 14/811,924, of Wolter, J.A., et al., filed Jul. 29, 2015.

(Continued)

*Primary Examiner* — Ethan D Civan
(74) *Attorney, Agent, or Firm* — Mattingly & Malur, PC

(57) ABSTRACT

Techniques for performing processing and providing notifications for potentially missing items of an order are described herein. Some implementations analyze data regarding previous orders to predict a level of risk that a current order will be delivered without an item. If an order is associated with a relatively high level of risk, a courier may be informed to check an order for an item when retrieving the order from the merchant. The courier may receive a notification to check the order when the courier arrives at the merchant's location.

20 Claims, 15 Drawing Sheets

(56) References Cited

U.S. PATENT DOCUMENTS

2017/0147951 A1   5/2017  Meyer et al.
2018/0025407 A1   1/2018  Zhang et al.

OTHER PUBLICATIONS

Non-Final Office Action dated Oct. 18, 2018, for U.S. Appl. No. 15/081,066, of Bhorania, J., et al., filed Mar. 25, 2016.
Non-Final Office Action dated Oct. 23, 2018, for U.S. Appl. No. 15/081,113, of Bhorania, J., et al., filed Mar. 25, 2016.
Final Office Action dated Nov. 2, 2018, for U.S. Appl. No. 14/811,924, of Wolter, J.A., et al., filed Jul. 29, 2015.
Non-Final Office Action dated May 29, 2019, for U.S. Appl. No. 14/811,924, of Wolter, J.A., et al., filed Jul. 29, 2015.
Final Office Action dated May 30, 2019, for U.S. Appl. No. 15/081,113, of Bhorania, J., et al., filed Mar. 25, 2016.
Final Office Action dated Jun. 3, 2019, for U.S. Appl. No. 15/081,066, of Bhorania, J., et al., filed Mar. 25, 2016.

\* cited by examiner

COURIER NOTIFICATIONS REGARDING MISSING ITEMS

CROSS REFERENCE TO RELATED APPLICATIONS

This application claims priority to U.S. Provisional Patent Application No. 62/301,228, filed Feb. 29, 2016, titled "Processing and Notifications regarding Missing and Unavailable Items," the entire contents of which are incorporated herein by reference.

BACKGROUND

Buyers conduct transactions with merchants for various types of items. In some instances, an order will be delivered or otherwise fulfilled by a merchant without a particular item that was ordered. In other instances, an order may be placed for an item that is actually unavailable at a merchant (e.g., due to the item being out-of-stock or otherwise unavailable). In any of these instances, the buyer and merchant may contact each other to request a refund, request that an item be ordered again, cancel an order, and so on. As such, the merchant and/or buyer may perform extra processing and/or functions to resolve the issue, often resulting in increased usage of network resources, computing resources, etc.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
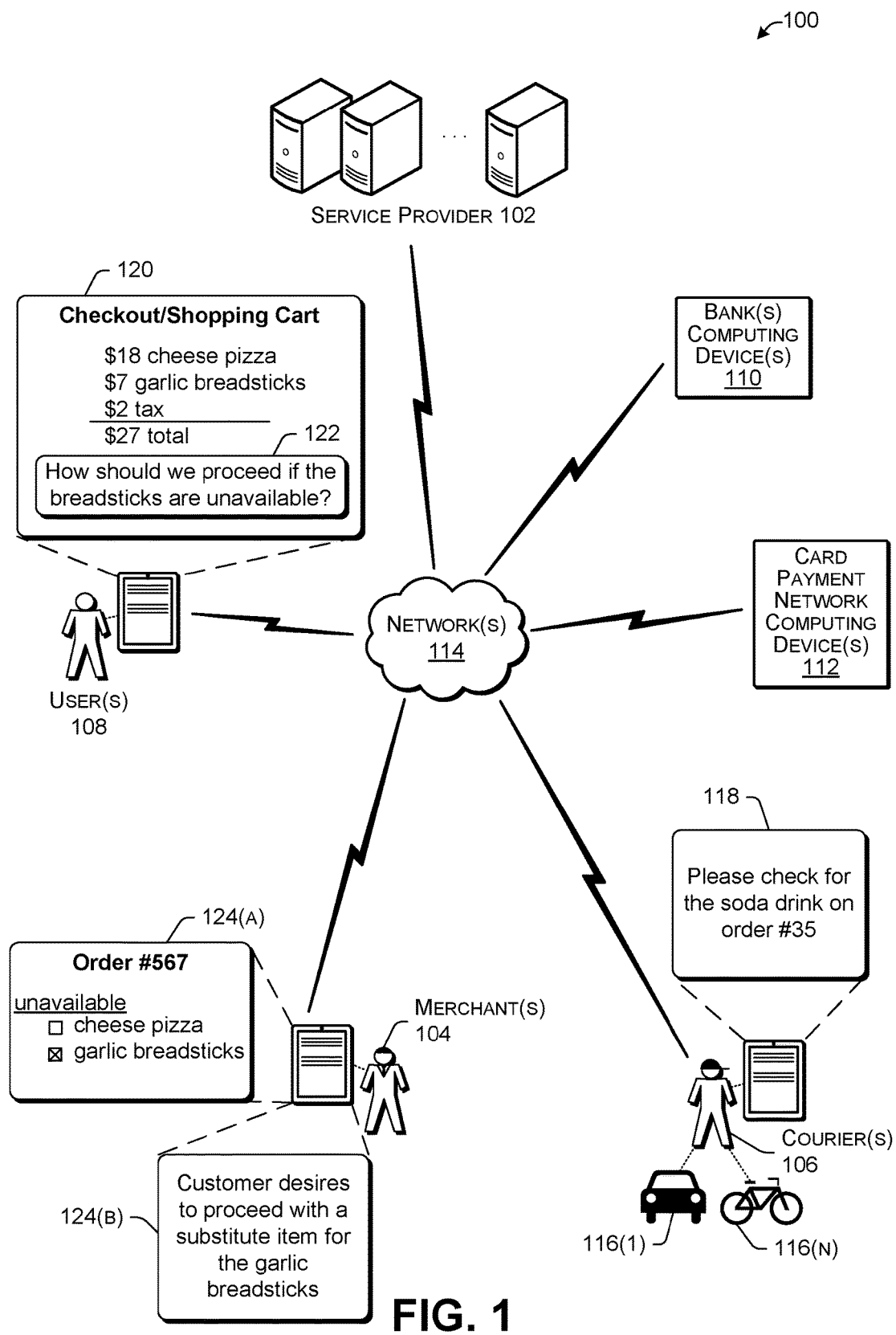
FIG. 1 illustrates an example architecture in which the techniques discussed herein may be implemented.

The technology discussed herein provides a novel system and environment for performing processing for potentially missing and/or unavailable items of an order. Some implementations discussed herein analyze data regarding previous orders to predict a level of risk that a current order will be delivered without an item. If an order is associated with a relatively high level of risk, a communication may be sent to a courier to request that the courier check, while the courier is at or near the merchant location while retrieving the order from the merchant, that the item is included in the order. Further, some implementations discussed herein analyze data regarding previously unavailable items to predict a level of risk that an item of a current order will be unavailable at a merchant for fulfillment of the order. If an order is associated with a relatively high level of risk, a buyer may be prompted to provide instructions at the time of purchasing the item regarding how to proceed with the order in the event that the item is actually unavailable. Thereafter, if the item is unavailable at a merchant, the merchant may be automatically notified to proceed according to the instructions (e.g., cancel the order, use a substitute item, proceed without the item, contact the buyer, etc.).

In many instances, the techniques are discussed herein in the context of a service computing device that communicates with courier devices to cause the courier devices to retrieve orders from merchants and deliver the orders to buyers. To do so, locations of merchants, couriers, and/or buyers may be determined by a GPS (Global Positioning System) receiver or other location sensor onboard a merchant device, courier device, or user device. This location information may be transmitted to the service computing device and used to provide notifications regarding unavailable and/or missing items, facilitate delivery of orders to buyers, and/or perform other processing. As such, the technology herein may employ a plurality of computing devices, mobile devices, and/or location sensors in a novel technological arrangement to deliver orders, provide notifications regarding unavailable and/or missing items, and so on.

In some instances of performing processing for items that may potentially be missed in fulfillment, a service provider may provide a customer interface to enable a user to place an order for an item with a merchant. When an order is placed, the service provider may identify a courier to deliver the order to the buyer based on a location of the courier that is monitored over time. The service provider may send a delivery request to the courier requesting that the courier retrieve the order from the merchant and deliver the order to the buyer. The service provider may also provide other information to assist in delivery, such as a route to travel, time an item will be ready for pick-up, time of expected delivery by the buyer, and so on.

The service provider may analyze transaction records regarding previous orders that were delivered with missing items to predict a likelihood of the current order being delivered with a missing item. For example, the service provider may analyze records of conversations between buyers and customer service agents regarding a refund, an extra order (e.g., to replace a missed item), and so on, due to an ordered item not being delivered to the buyers. The service provider may perform the analysis to identify a pattern of the previous orders that were delivered with missing items. As one example, the pattern may indicate that a majority of the orders that were delivered with missing items are over seventy-five dollars in price. As another example, the pattern may indicate a majority of the orders that were delivered with missing items are associated with eight or more items. In yet another example, the pattern may identify a particular merchant or courier that frequently misses items during fulfillment. In a further example, the pattern may indicate that deliveries with missing items generally occur at a particular time of the day (e.g., during lunch) or time of the week (e.g., Mondays). In yet other examples, the pattern may indicate other characteristics of orders that are delivered with missing items. In many instances, the analysis may identify an item (or type of item) that is generally missed (e.g., the courier John generally forgets to pick-up drinks, Dave's Pizza generally forgets to put salad dressing in the bag for the courier to pick-up, etc.).

The service provider may utilize the pattern from the analysis to predict if the order that has just been placed is likely to be delivered with a missing item. For example, if an order that includes drinks is being delivered by a particular courier that frequently forgets to pick-up drinks, then there is a relatively high likelihood that the drinks will be missed in delivering the order. As another example, if an order that includes salad dressing is being prepared by a merchant that frequently forgets to include sides (such as salad dressing), then there is a relatively high likelihood that the salad dressing will be missed in fulfilling the order.

When the service provider predicts that there is a relatively high likelihood of an item being missed in a current order (e.g., more than a threshold), the service provider may send a communication to the courier to remind the courier to pick-up an item. The service provider may monitor a location of the courier to send the communication when the courier arrives at the merchant's location. Although the communication may be sent at other times. For example, if it is determined that the courier John generally forgets to pick-up drinks from pizza merchants, and John is currently in route to pick-up an order that includes a drink from a pizza merchant, then a reminder notification may be sent to John as he arrives as the pizza merchant's establishment (e.g., "Don't forget to pick-up two sodas"). Additionally, or alternatively, the service provider may send a communication to a merchant to remind the merchant to include an item. For example, if it is determined the Dave's Pizza forgets to include salad dressing on orders over fifty dollars, a reminder notification may be sent to a device associated with Dave's Pizza (e.g., "Don't forget to include the salad dressing"). In many instances, the techniques may intelligently provide notifications to couriers, merchants, and others regarding an item that may be potentially missed in fulfilling an order. In the case of a courier, a location of the courier may monitored to notify the courier at the most opportune time (e.g., as the courier arrives at the merchant's location for pick-up). This may avoid an item being missed in delivery.

Further, in some instances of performing processing for items that may potentially be unavailable during fulfillment, the service provider may receive user input regarding selection of an item to place an order with a merchant. For example, a user may place an item in an online shopping cart. The service provider may analyze historical data regarding items that have been previously unavailable to predict a likelihood that the item of the current order will be unavailable for fulfillment. For example, the service provider may analyze data regarding items that have been previously marked by a merchant as unavailable for fulfillment of previous orders. The service provider may perform the analysis on the historical data to determine a characteristic of items that are frequently unavailable. As one example, the service provider may determine that breadsticks are frequently unavailable after lunch. As another example, the service provider may determine that rolls are frequently unavailable for a particular merchant every Thursday afternoon. In any event, the service provider may use this information to predict a likelihood that the item of the current order will be unavailable for fulfillment. For example, if the service provider determines that a particular pizza from Dave's Pizza has frequently been unavailable on Saturdays, then the service provider may predict that a current order for the particular pizza placed on Saturday will likely be unavailable for fulfillment.

When the service provider predicts that there is a relatively high likelihood of an item being unavailable for fulfillment (e.g., more than a threshold), the service provider may prompt a buyer for instructions on how to proceed with the order in the event that the item is actually unavailable. For example, if a particular pizza (along with other items) is placed in an online shopping cart, and the particular pizza has a relatively high likelihood of being unavailable, a window may pop-up to ask if a user would like to cancel the order, proceed without the particular pizza, use a substitute item, or be contacted in the event that the particular pizza is unavailable for fulfillment of the order. The buyer may provide instructions and proceed with placing the order.

Thereafter, if the service provider receives a communication from a merchant indicating that an ordered item is unavailable for fulfillment, the service provider may proceed according to the instructions that were provided by the buyer. For instance, if the instructions indicate that the buyer would like to use a substitute item for an unavailable item, the service provider may instruct the merchant to use the substitute item. In some instances, a substitute item may be recommended by the merchant, while in other instances the substitute item may be recommended by the service provider or others. The service provider may also send a communication to the buyer informing the buyer of the change to the order. As such, in many instances the techniques may intelligently predict items that are potentially unavailable for fulfillment and obtain instructions in advance for how to proceed in the event that the items are unavailable. This may avoid a merchant or others from having to contact a buyer to resolve an issue, resulting in reduced usage of network resources and/or computing resources.

This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 illustrates an example architecture 100 in which the techniques discussed herein may be implemented. The architecture 100 includes a service provider 102 that communicates with one or more merchants 104 (hereinafter "the merchant 104"), one or more couriers 106 (hereinafter "the courier 106"), one or more users 108 (hereinafter "the user 108"), one or more bank computing devices 110, and/or one or more card payment network computing devices 112 to perform a variety of processing. As one example, the service provider 102 may provide notifications to the courier 106 to make sure an item is picked-up from the merchant 104. As another example, the service provider 102 may receive instructions from the user 108 on how to proceed with an order in the event that an item is unavailable for fulfillment and automatically proceed with the order according to the instructions when the item is unavailable at the merchant 104. Further, in some instances the service provider 102 may facilitate transactions between buyers and sellers, which may include communicating with the one or more bank computing devices 110 and/or the one or more card payment network computing devices 112. Each of the merchants 104, the courier 106, and/or the user 108 may be associated with a computing device. As illustrated, any of the computing devices of the architecture 100 may communicate with each other via one or more networks 114. The courier 106 may employ one or more of a plurality of vehicles 116(1)-116(n), such as automobiles, bicycles, scooters, motorcycles, buses, airplanes, helicopters, boats, skateboards, etc. Although in other instances the courier 106 may travel by foot or otherwise without a vehicle.

In many instances discussed herein, the service provider 102 provide various user interfaces to facilitate a transaction. For example, the service provider 102 may implement a customer interface (e.g., online, mobile application, etc.) to enable buyers to purchase items from merchants. The customer interface may display a catalog of items that are offered for acquisition by the merchant and display other interfaces to order an item (e.g., checkout screens, etc.). The service provider 102 may also provide a merchant interface (e.g., online, mobile application, etc.) to enable merchants to fulfill orders. The merchant interface may list items that are ordered, delivery times, couriers to retrieve the items, instructions for how to proceed if an item is unavailable, and so on. Further, the service provider 102 may provide a courier interface (e.g., online, mobile application, etc.) to enable couriers to delivery items to buyers. The courier interface may list orders that are assigned to a courier, details regarding an order (e.g., items ordered, price of order, etc.), merchant information (e.g., pick-up location, merchant's telephone number, etc.), buyer information (e.g., delivery location, buyer's telephone number, etc.), customer service information (e.g., a telephone number of a customer service agent associated with the service provider 102 that may handle issues with an order), and so on. However, in other instances any number of the interfaces may be provided by other entities, such as the merchant 108, the courier 106 (e.g., a service associated with the courier 106), the user 108, and so on.

A merchant may include any business engaged in the offering of goods or services for acquisition by buyers in exchange for compensation received from the buyers. Actions attributed to a merchant may include actions performed by employees or other agents of the merchant and, thus, no distinction is made herein between merchants and their employees unless specifically discussed. In addition, a buyer (e.g., user) may include any entity that acquires goods or services from a merchant, such as by purchasing, renting, leasing, borrowing, licensing or the like. Hereinafter, goods and/or services may be referred to as items. An item may include a finished product, partially finished product, raw material, and so on. Thus, a merchant and a buyer may interact with each other to conduct a transaction in which the buyer acquires one or more items from a merchant, and in return, the buyer provides payment to the merchant.

A courier may include any entity engaged in delivering an item. In one example, a courier may transport an item from a merchant to a user (e.g., upon purchase of the item by the user from the merchant). In another example, a courier may transport an item from a supplier to a merchant. In yet another example, a courier may transport an item between merchants. Some implementations discussed herein enable people to participate as couriers in a type of crowdsourced service economy. Here, essentially any person with a mobile device is able to immediately become a courier, or cease to be a courier, in a courier network that provides delivery services for delivery of items. For example, a user or a merchant may become a courier.

The service provider 102 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

As noted above, the service provider 102 may perform various processing regarding items that may potentially be missed during fulfillment of an order. Fulfillment of an order may generally include acts performed once an order has been placed to provide a buyer with an item, such as creating or preparing an item (e.g., baking food, manufacturing an item, etc.), packaging an item for delivery (e.g., putting an item in a box for shipment, placing food in a package for delivery, etc.), retrieving an item for delivery, delivering an item to a buyer, and so on. In the example of FIG. 1, the user 108 uses an online courier service to place a food order with the merchant 104 for delivery to a location of the user 108. In particular, the order includes a hamburger, French fries, and a soda drink. Here, the service provider 102 has selected a particular courier, namely the courier 106, to make the delivery due to a proximity of the courier 106 to the merchant 104 and/or the user 108. The service provider 102 analyzes previous transaction records for the courier 106 to determine that the courier 106 has forgotten to pick-up soda drinks from the merchant 104 four times over the past month. In this example, the transaction records indicate that customers contacted customer service agents to inform them that orders were delivered by the courier 106 without soda drinks. Further, the transaction records indicate that the customer service agent checked with the merchant 104 to find out that the soda drinks were prepared by the merchant 104, but the courier 106 forgot to pick them up. As such, the service provider 102 determines that the current order for a hamburger, French fries, and a soda drink has a relatively high risk (higher than a threshold) of being delivered without the soda drink.

The service provider 102 then monitors a location of the courier 106 to determine when the courier 106 arrives at a location of the merchant 104 (or is located within a predetermined proximity to the merchant 104). In this example, the courier 106 travels to a pickup location, which may typically be the merchant's place of business. Upon arriving at the pick-up location, the service provider 102 sends a communication to the courier 106 to remind the courier 106 about the soda drink. A notification 118 may then be presented via the computing device associated with the courier 106 to request that the courier 106 "Please check for the soda drink on order #35." The notification 118 may be provided in a visual, audible, or other manner. The notification 118 may include a text message, email, pop-up window, audible sound, and so on. In some instances, the notification 118 is presented as a message via a courier application that is used to provide details about items that the courier 106 is assigned to deliver. The courier 106 may check that the merchant 104 included the soda drink in the order and/or check that the courier 106 picks-up the soda drink. Alternatively, or additionally, a notification may be provided to the merchant 104 (via the computing device associated with the merchant 104) to remind the merchant 104 to prepare the soda drink and/or to request that the merchant 104 check that the courier 106 picks-up the soda drink upon arrival.

Although the notification 118 is described as being provided upon arrival the merchant's location, the notification 118 may be provided in other contexts, such as when the courier 106 checks-in with the merchant 104, when the courier 106 indicates that the items have been picked-up, when the merchant 104 indicates that the items have been picked-up, and so on.

Further, as also noted above, the service provider 102 may perform various processing regarding items that may potentially be unavailable during fulfillment of an order. An item may generally be referred to as unavailable for fulfillment if the item is out-of-stock, not able to be created/prepared due to sub-components being out-of-stock, and so on. For example, suppose that a buyer views an online catalog of items that are offered for acquisition by a merchant, the buyer places an order for a particular item, and information about the order is sent to the merchant for fulfillment. If the merchant realizes that the particular item is actually out-of-stock, the particular item may be unavailable.

In the example of FIG. 1, the user 108 accesses an online catalog of items that are offered for acquisition by the merchant 104 and places a pizza and breadsticks in an online shopping cart. Customer interface 120 displays a checkout or shopping cart view. The service provider 102 analyzes historical data regarding items that have been previously unavailable to predict a likelihood that the pizza or the breadsticks will be unavailable for fulfillment. Such analysis may be performed in real-time as the order is being placed, before the items are placed in the online shopping cart (e.g., pre-flag any items that may potentially be unavailable), or at any other time. Here, the service provider 102 analyzes records regarding items that the merchant 104 has previously flagged as being unavailable after orders were placed for those items. The analysis may generally identify items that are frequently unavailable, merchants that are frequently unable to fulfill orders due to unavailable items, times when items are frequently unavailable, and so on.

As noted above, the information gained from the analysis may be used to predict a likelihood that the pizza and/or breadsticks will be unavailable. For instance, if it is determined that breadsticks are frequently unavailable after lunch, and the pizza and breadsticks are placed in the online shopping cart at 1 PM for immediate delivery, the service provider 102 may predict a relatively high likelihood of the breadsticks being unavailable. In this example, the likelihood of breadsticks being unavailable is higher than a threshold, and so, the service provider 102 prompts the user 108 for instructions on how to proceed with the order in the event that the breadsticks are unavailable. Here, a pop-up window 122 is displayed to request the instructions. Although not illustrated in FIG. 1, the pop-up window 122 may include selectable interface elements to specify, for example, whether the user 108 would like to proceed with a substitute item, cancel the entire order, cancel the breadsticks, be contacted, and so on. Upon providing instructions, the user 108 may place the order and the service provider 102 may send a communication to the merchant 104 to inform the merchant 104 of the order.

The merchant 104 may view a merchant interface 124(a) with details of the order. As illustrated, the merchant interface 124(a) enables the merchant 104 to specify whether or not an item is unavailable. In this example, the merchant 104 specifies that the breadsticks are unavailable (e.g., out-of-stock) and a communication is sent back to the service provider 102 to inform the service provider 102 of such unavailability. The service provider 102 may reference the instructions from the user 108 and instruct the merchant 104 to proceed accordingly. As illustrated in the merchant interface 124(b), a message is displayed to the merchant 104 indicating that "Customer desires to proceed with a substitute item for the garlic breadsticks." The substitute item may be identified in a recommendation from the merchant 104, the service provider 102, the user 108, or others. As such, the merchant 104 may proceed with substituting out the breadsticks with, for example, a similarly priced item in a same category as the breadsticks, such as chicken wings that are in the appetizer category and cost $7.50. Although the example above discusses the service provider 102 instructing the merchant 104 on how to proceed with the order after finding out from the merchant 104 that the breadsticks are unavailable, in some instance the instructions from the user 108 may be sent when the order is sent to the merchant 104. That is, the merchant 104 may avoid contacting the service provider 102 to find out how to proceed, and instead, reference the instructions locally.

The service provider 102 may also communicate with the one or more card payment network computing devices 112 to conduct a transaction electronically. The one or more card payment network computing devices 112 may be associated with a card payment network (e.g., MasterCard®, VISA®, etc.). The service provider 102 may also communicate with the one or more bank computing devices 110 of one or more banks. For example, the service provider 102 may communicate with an acquiring bank, an issuing bank, and/or a bank maintaining user accounts for electronic payments.

An acquiring bank may be a registered member of a card association (e.g., Visa®, MasterCard®, etc.), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, a user may use a debit card instead of a credit card, in which case, the bank computing device(s) of a bank corresponding to the debit card may receive communications regarding a transaction in which the user is participating. Additionally, there may be computing devices of other financial institutions involved in some types of transactions or in alternative system architectures, and thus, the foregoing are merely several examples for discussion purposes.

As noted above, one or more computing devices of the architecture 100 may communicate via the one or more networks 114. The one or more networks 114 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 114 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the architecture 100 may communicatively couple to the one or more networks 114 in any manner, such as by a wired or wireless connection.

Although many techniques are described herein as being performed by a particular device, any number of the techniques may be performed by other devices. For example, techniques described as being performed by the service provider 102, may be performed locally at a computing device of one of the merchants 104, the courier 106, and/or the user 108.

Figure 2:
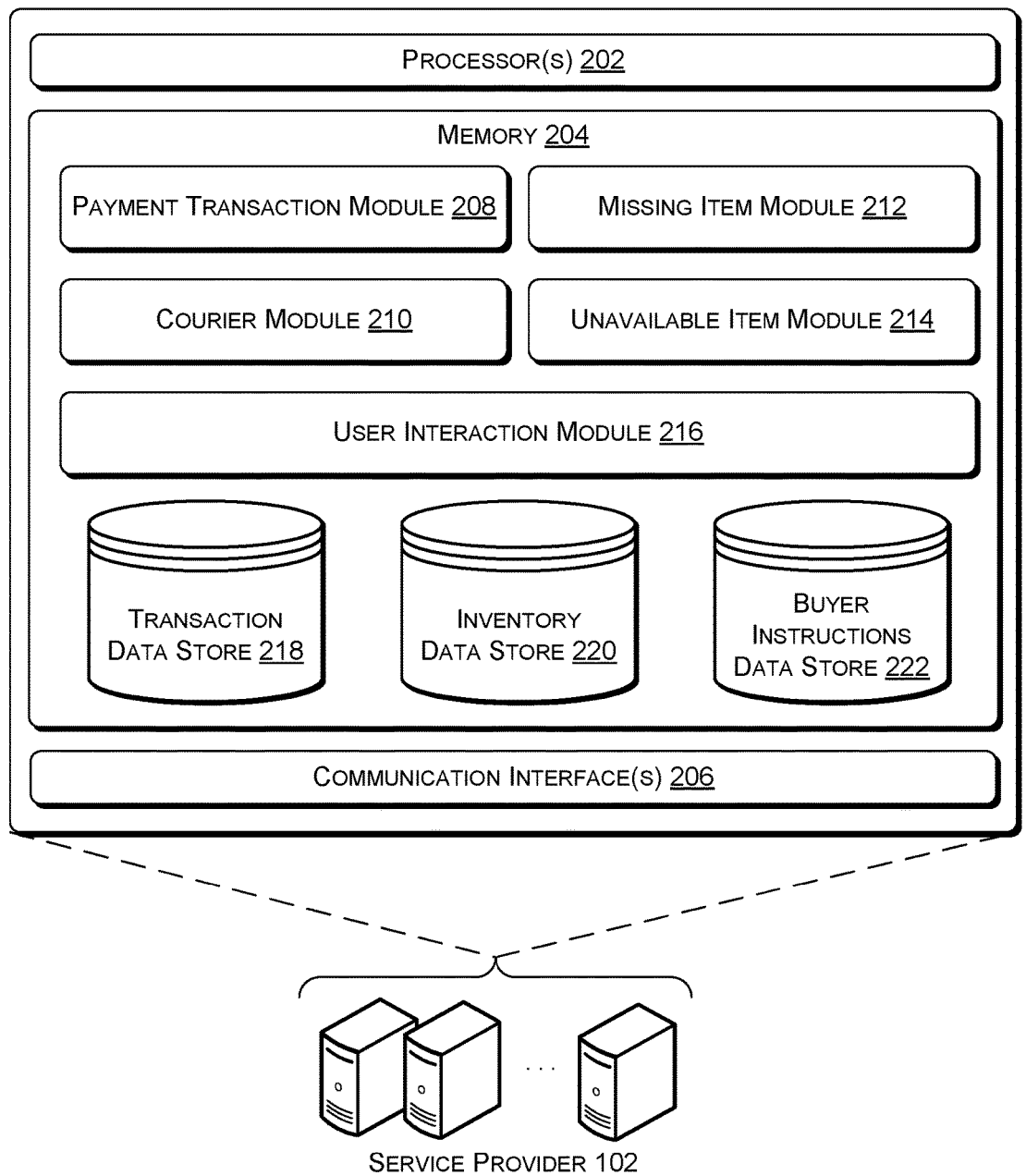
FIG. 2 illustrates example details of a service provider.

FIG. 2 illustrates example details of the service provider 102 of FIG. 1. As noted above, the service provider 102 may be implemented as one or more computing devices (e.g., one or more service computing devices). The one or more computing devices may include one or more processors 202, memory 204, and one or more communication interfaces 206. The one or more processors 202 may include a central processing unit (CPU), a graphics processing unit (GPU), a microprocessor, a digital signal processor, and so on.

The memory 204 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

The memory 204 (as well as all other memory described herein, including memory of a merchant device, a courier device, a user device, and so on) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

As illustrated, the memory 204 includes a payment transaction module 208, a courier module 210, a missing item module 212, an unavailable item module 214, and a user interaction module 216.

The payment transaction module 208 may facilitate transactions between merchants, users, and/or couriers. During a transaction, a user (e.g., customer/buyer) may acquire an item from a merchant by purchasing, renting, leasing, borrowing, licensing, or the like. An item may refer to a good and/or a service offered by merchants. A courier may transport the item from the merchant to the buyer and, in some instances, receive payment from the buyer when delivering the item. The payment transaction module 208 may be configured to enable electronic payments for transactions. In some instances, the service provider 102 may include one or more computing devices that are configured to perform secure electronic financial transactions between merchants and users through, for example, data communicated between a user device and a merchant device. When paying for a transaction, a user can provide the amount of payment that is due to a merchant using cash, check, a payment card, NFC, or by electronic payment. The merchant (or courier) may interact with a device to process the transaction at a point of sale (POS) (e.g., the place where the user meets with the merchant or courier). Further, the transaction may be processed by electronically transferring funds from a financial account associated with a user account for the user to a financial account associated with a merchant account for the merchant. During the transaction, the merchant device can determine and send data describing the transaction, including, for example, appointment data, services related to and/or provided, item(s) being purchased, the amount of the item(s), buyer information, and so forth.

The payment transaction module 208 may store transaction records in a transaction data store 218. A transaction record may include information regarding a time, place and/or an amount of a transaction (e.g., order), information related to the item acquired (e.g., information identifying the item sold), a type of payment being used (e.g., cash, check, payment card, electronic payment, etc.), as well as additional information, such as buyer information. For instance, if a payment card is used, a transaction record can include data stored in the payment card (e.g., Track 1 data (cardholder name, card number and other card information)). In addition, when completing the transaction, a buyer may sometimes provide a receipt email address for receiving a receipt through email. Other examples of data that can be captured for a transaction record include item information (e.g., an itemized listing of the items being acquired, the price being paid for each item, descriptors of the items (size, flavor, color, etc.), geolocation data indicating a geographic POS location of a particular transaction, online/offline card data, data describing the merchant (e.g., a merchant identifier, a merchant category code (MCC), etc.), data identifying a courier delivering an item, any type of data that is received upon a buyer's authentication into a social network, if any, and various other types of information.

Further, a transaction record may include data related to missing items. As one example, a customer may contact a merchant or the service provider 102 (e.g., via email, text message, telephone, a customer service agent, etc.) to inform the party that an item of a previous order (e.g., transaction) was not delivered and to request that the item be delivered. Here, a transaction record may be created for an order that is placed internally at the merchant to account for the missed item. The missed item may be delivered at no cost to the customer. The new transaction record for the additional order may be linked to the previous transaction record. Such new transaction record may be referred to as "saved order data." As another example, a customer may contact a merchant or the service provider 102 to request a refund for an item that was not delivered. Here, a transaction record for the previous order may be updated to indicate that a refund was issued. Such transaction record may be referred to as "adjustment data." As yet another example, a courier may provide a note in a transaction record (or linked to the transaction record) indicating that an item was not provided by a merchant. As a further example, a merchant may provide a note in a transaction record (or linked to the transaction record) indicating that a courier did not pick-up an item. As such, a transaction record may include feedback information from merchants, couriers, buyers, etc. regarding transactions in which the parties were involved.

Further, a transaction record may include data related to unavailable items. As one example, suppose that a customer has placed an order for an item with a merchant, and the item is actually out-of-stock or otherwise unavailable for fulfillment at the merchant. Here, a transaction record associated with the order may be updated to reflect the unavailability (e.g., based on the merchant informing the service provider 102 of the unavailability). Further, the customer, the service provider 102, and/or others may be informed of this unavailability. In some instances, a customer service agent may contact the customer to find out how the customer would like to proceed. If the customer selects a substitute item, the transaction record may be updated to reflect the change. An update to an order to include a substitute item may indicate that an item was unavailable to fulfill an order.

Although various types of information are described as being included within transaction records, any of this information may alternatively, or additionally, be included within other types of records. For example, a conversation between a customer service agent and a customer regarding a missed or unavailable item of an order may be recorded in a record that is separate from, but linked to, a transaction record describing the order.

In some implementations, the payment transaction module 208 enables card-less payments (e.g., electronic payments) for transactions between user, merchants, and/or couriers based on interaction of the user with a user device and interaction of the merchant/courier with a device. Accordingly, in some examples a card-less payment transaction may include a transaction conducted at a POS location during which an electronic payment account of the user is charged without the user having to physically present a payment card to the merchant/courier at the POS location. Consequently, the merchant/courier need not receive any details about the financial account of the user for the transaction to be processed. As one example, the electronic payment may be charged to a credit card issuer or credit card number that the user provided when signing up with the service provider 102 for an electronic payment account. As another example, the user may have a quantity of money pre-paid in an account maintained for use in making the electronic payments. Other variations will also be apparent to those of skill in the art having the benefit of the disclosure herein.

The courier module 210 may arrange deliveries for couriers. The courier module 210 may generally select a courier for a delivery and communicate with the courier for the delivery. For example, the courier module 210 may select a courier to transport an item from a seller (e.g., merchant) to a buyer based on a location of the courier relative to the seller and/or the buyer. In some instances, the courier module 210 may track locations of couriers (e.g., when users or merchants act as couriers managed by the service provider 102, when the service provider 102 is associated with a courier service, etc.). To illustrate, the courier module 210 may track locations of the couriers before, during, and after a delivery based on location information received from associated courier devices (e.g., mobile devices). Further, in some instances the courier module 210 may manage the couriers through activation, movement, positioning, and/or deactivation of the couriers. A courier may deliver items to merchants, suppliers, users, and so on.

The missing item module 212 may perform processing for items that may potentially be missed in fulfillment of an order. For example, the missing item module 212 may analyze various types of data regarding previous orders to identify a pattern (or characteristic) of the previous orders that were delivered with missing items (e.g., items are frequently missed in orders over a particular price, items are frequently missed in orders having a relatively large quantity of items, a particular merchant frequently does not include items of a particular category, a particular courier frequently does not pick-up or deliver items of a particular category, items are frequently missed in orders at a particular time, etc.). In some instances, the missing item module 212 may analyze transaction records that have been collected over time and stored in the transaction data store 218. However, in other instances the missing item module 208 may analyze other types of data. The transaction records may be collected from a variety of sources, including merchants, couriers, buyers, etc.

The missing item module 208 may utilize patterns (or characteristics) identified from analyzing previous orders that were delivered with missing items to predict when an item of a current order will likely be missed in fulfillment. If an item is associated with a relatively high likelihood of risk of being fulfilled without an item, the missing item module 212 may send various communications to a courier and/or a merchant as a reminder to check for the item at various stages of fulfillment, so that the item is ultimately delivered to a buyer.

The unavailable item module 210 may perform processing for items that may potentially be unavailable during fulfillment of an order. For example, the unavailable item module 214 may analyze various types of data to predict when an item of a current order will likely be unavailable. In some instances, the unavailable item module 212 may analyze transaction records regarding previous orders that are associated with items that were unavailable during fulfillment to identify a pattern (or characteristic) of the previous orders (e.g., a particular item is frequently unavailable from a particular merchant, items of a particular category are frequently unavailable, items that are ordered at a particular time of the day or time of the week are frequently unavailable, etc.).

The unavailable item module 210 may utilize patterns (or characteristics) identified from analyzing previous orders and/or utilize additional information to predict when an item of a current order will likely be unavailable during fulfillment. In some instances, the additional information may include inventory data indicating a current inventory of an item at a merchant, sales data indicating a rate at which an item is being sold, and so on. If an item is associated with a relatively high likelihood of risk of being unavailable, the unavailable item module 210 may prompt a buyer at the time of placing the order for instructions on how to proceed with the order in the event that the item is unavailable for fulfillment. Upon receiving the instructions from a buyer, the instructions may be stored in a buyer instructions data store 222. If the item is unavailable during fulfillment, the instructions may be referenced to instruct a merchant or others on how to proceed. For example, for an item that has been identified as being unavailable, the unavailable item module 210 may proceed to instruct the merchant to cancel the order, proceed without the item, use a substitute item, and so on.

The payment transaction module 208, the courier module 210, the missing item module 212, and/or the unavailable item module 214 may operate in cooperation with the user interaction module 216 to handle communications with merchants, users, and/or couriers. For example, the user interaction module 216 may operate in accordance with instructions from the missing item module 212 to send a notification to a courier regarding a potentially missing item. Additionally, or alternatively, the user interaction module 216 may operate in accordance with instructions from the unavailable item module 214 to communicate with a buyer, merchant, and/or courier regarding a potentially unavailable item. The user interaction module 216 may facilitate user interfaces via the computing devices, such as a customer interface, merchant interface, a courier interface, and so on.

While FIG. 2 illustrates components and data of the service provider 102 as being present in a single location, these components and data may alternatively be distributed across different computing devices and/or different locations in any manner. Consequently, the functions may be implemented by one or more computing devices, with the various functionality described being distributed in various ways across the different computing devices. Multiple computing devices may be located together or separately, and organized, for example, as virtual servers, server banks, and/or server farms. The described functionality may be provided by the servers of a single entity or enterprise, or may be provided by the servers and/or services of multiple different buyers or enterprises.

Figure 3:
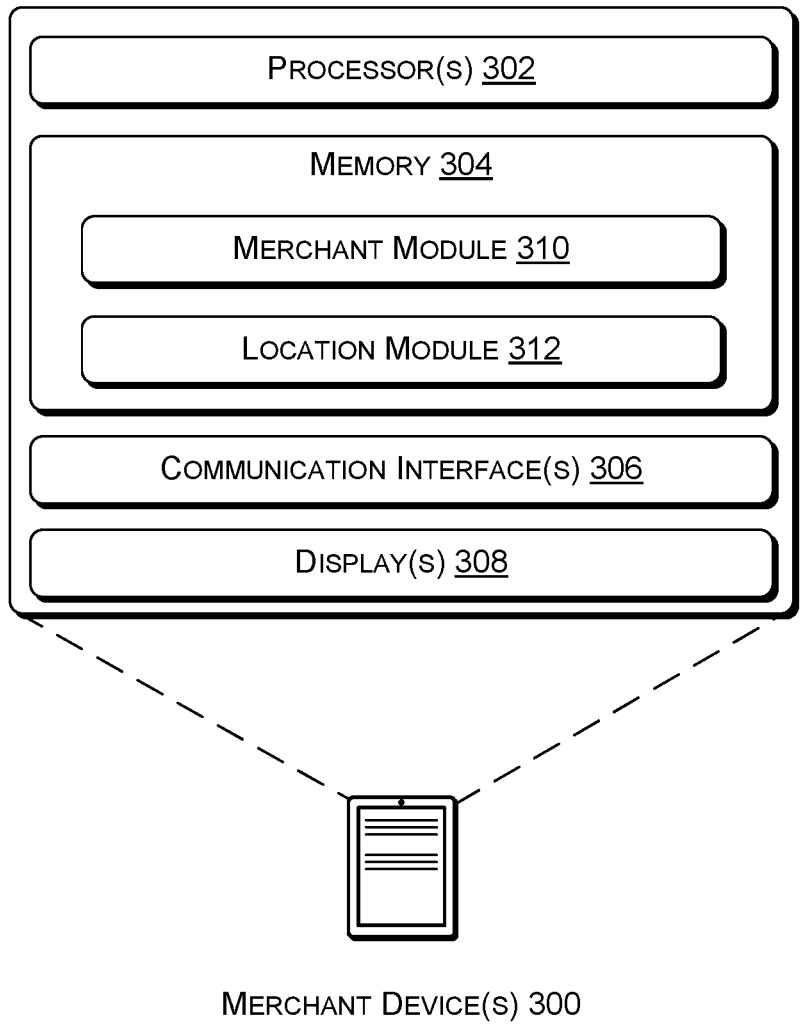
FIG. 3 illustrates example details of a merchant device.

FIG. 3 illustrates example details of a merchant device 300. The merchant device 300 may be employed by a merchant of the merchants 104 of FIG. 1. The merchant device 300 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile (e.g., navigation system), an appliance, a camera, a robot, a hologram system, a security system, a home-based computer system (e.g., intercom system, home media system, etc.), a projector, an automated teller machine (ATM), and so on. In some instances, the merchant device 300 may be a mobile device.

The merchant device 300 may include one or more processors 302, memory 304, one or more communication interfaces 306, and one or more displays 308. The one or more processors 302 may include a central processing unit (CPU), a graphics processing unit (GPU), a microprocessor, a digital signal processor, and so on. The one or more displays 308 may include a touch screen, a Liquid-crystal Display (LCD), a Light-emitting Diode (LED) display, an organic LED display, a plasma display, an electronic paper display, or any other type of technology. Although not illustrated, the merchant device 300 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The merchant device 300 may additionally include, or be associated with, input device(s) such as a keyboard, a mouse, a pen, a voice input device, a touch input device, etc. The memory 304 may include a merchant module 310 and a location module 312.

The merchant module 310 (e.g., merchant application) may perform various processes to assist a merchant in processing transactions with customers, managing inventory, communicating with couriers, and so on. The merchant module 310 may provide various interfaces and/or dashboards. In one example, the merchant module 310 may facilitate transactions with customers by accepting payment from customers (e.g., via a card reader, NFC connection to a customer device, Bluetooth® connection to customer device, etc.), providing receipts for items (including printing receipts), receiving input from customers for items being acquired by the customers (e.g., confirmation, signature for credit card, etc.), and so on. In another example, the merchant module 310 may provide information regarding items that are ordered for delivery, such as item order details (e.g., a list of items ordered, price, etc.), a delivery time, a courier to deliver order, and so on. In yet another example, the merchant module 310 may enable the merchant to indicate that an item is unavailable, provide a recommendation for a substitute item, and/or view instructions regarding how a buyer would like to proceed for an unavailable item. In a further example, the merchant module 310 may enable a merchant to manage inventory by informing the merchant of inventory levels (e.g., number of items currently in-stock), order additional inventory, view notifications from the service provider 102 regarding inventory, offer inventory for acquisition to others, seek financing for inventory, and so on. In some instances, an interface may be provided to a customer to facilitate a transaction (e.g., an interface to confirm payment, provide a signature, etc.), manage inventory, view analytics data, and so on. The merchant module 310 may communicate with the service provider 102 to facilitate a variety of functionality (e.g., any components of the service provider 102).

The location module 312 may determine a location of the merchant device 300. In some instances, the location is provided to the service provider 102, or used locally, to facilitate various functions, such as processing of transactions when a customer is located within a particular proximity to the merchant device 300. The location module 312 may determine a geographic location of the merchant device 300 from geolocation techniques (e.g., satellite-based systems—global positioning system (GPS)), cell tower location data, wireless access point location data, wireless beacon location, and so forth. As such, the location module 312 may utilize data from a location sensor of the merchant device 300, such as a GPS receiver or communication interface that can determine (e.g., from cell towers or wireless access points) a geographic location of the merchant device 300.

In some types of businesses, the merchant device 300 may be associated with a store or other place of business of a merchant, and thus, may be a fixed location that typically does not change on a day-to-day basis. In other types of businesses, however, the merchant device 300 may move locations from time to time, such as in the case where the merchant operates a food truck, is a street vendor, a cab driver, etc. or has an otherwise mobile business (e.g., in the case of merchants who sell items at buyer's homes, places of business and so forth).

Figure 4:
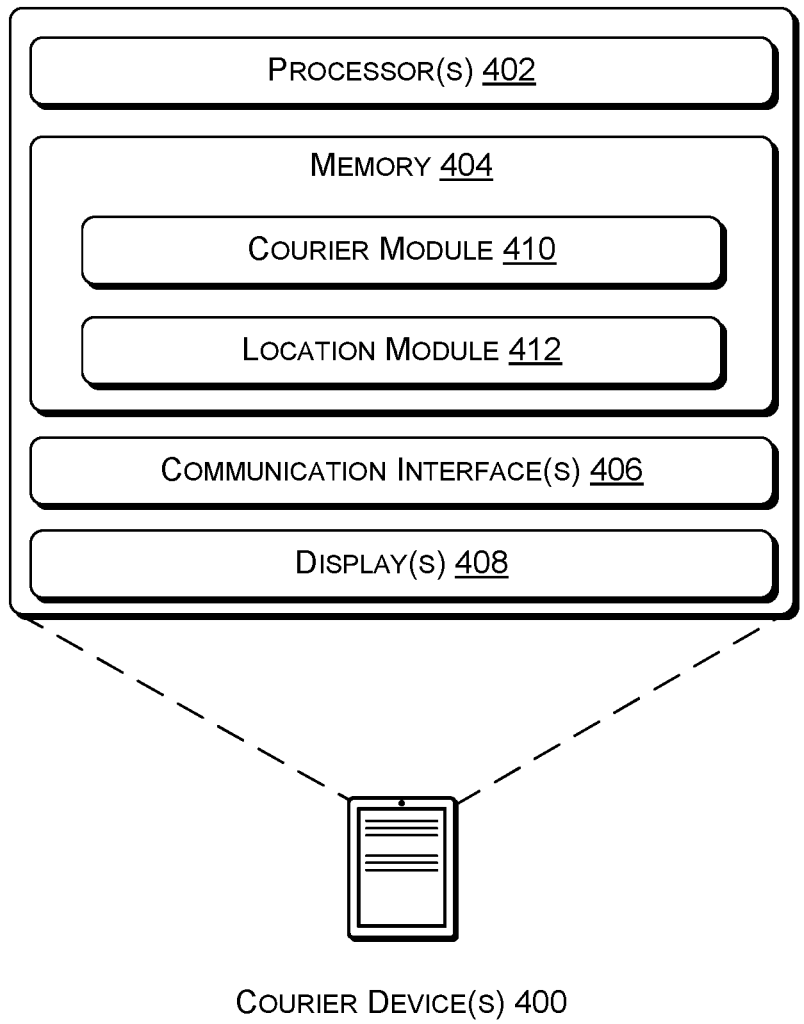
FIG. 4 illustrates example details of a courier device.

FIG. 4 illustrates example details of a courier device 400. The courier device 400 may be employed by the courier 106 of FIG. 1. The courier device 400 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile (e.g., a navigation system), an appliance, a camera, a robot, a hologram system, a security system, a home-based computer system (e.g., intercom system, home media system, etc.), a projector, an automated teller machine (ATM), and so on. In some instances, the courier device 400 may be a mobile device.

The courier device 400 may include one or more processors 402, memory 404, one or more communication interfaces 406, and one or more displays 408. The one or more processors 402 may include a central processing unit (CPU), a graphics processing unit (GPU), a microprocessor, a digital signal processor, and so on. The one or more displays 408 may include a touch screen, a Liquid-crystal Display (LCD), a Light-emitting Diode (LED) display, an organic LED display, a plasma display, an electronic paper display, or any other type of technology. Although not illustrated, the courier device 400 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The courier device 400 may additionally include, or be associated with, input device(s) such as a keyboard, a mouse, a pen, a voice input device, a touch input device, etc. The memory 404 may include a courier module 410 and a location module 412.

The courier module 410 (e.g., courier application) may receive order information from the service provider 102 to provide a courier with information for picking up a particular order from a merchant's pickup location and/or for delivering the order to a buyer delivery location. The courier module 410 may further enable the courier to respond to the service provider 102 to confirm acceptance of a delivery job. Additionally, or alternatively, the courier module 410 may provide notifications regarding missing items (e.g., "Please check order #34 for two bags of chips") and/or notification regarding unavailable items (e.g., "Order #56 has been canceled since an item was unavailable," "Order #89 includes a substitute item," etc.).

In some cases, the courier module 410 may facilitate the courier to become active or inactive (e.g., in cases where users are used as couriers). For example, the courier application 410 may be periodically pinged by the service provider 102 to determine interest in becoming active and, if so, requesting current location information of the associated courier. A courier who is interested in being activated may respond with location information, while a courier who is not interested in being activated may keep location information private by not responding.

The location module 412 may determine a location of the courier device 400. In some instances, the location is provided to the service provider 102, or used locally, to facilitate various functions. The location module 412 may determine a geographic location of the courier device 400 from geolocation techniques (e.g., satellite-based systems—global positioning system (GPS)), cell tower location data, wireless access point location data, wireless beacon location, and so forth. As such, the location module 412 may utilize data from a location sensor of the courier device 400, such as a GPS receiver or communication interface that can determine (e.g., from cell towers or wireless access points) a geographic location of the courier device 400.

Figure 5:
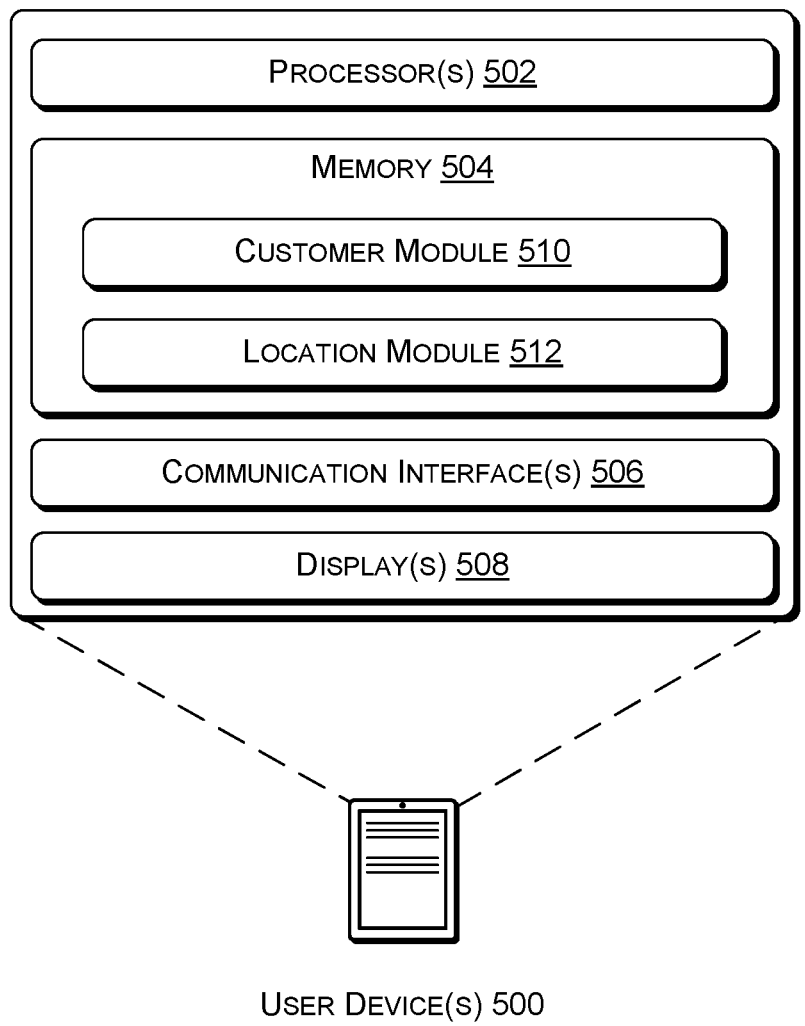
FIG. 5 illustrates example details of a user device.

FIG. 5 illustrates example details of a user device 500. The user device 500 may be employed by the user 108 of FIG. 1. The user device 500 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile (e.g., a navigation system), an appliance, a camera, a robot, a hologram system, a security system, a home-based computer system (e.g., intercom system, home media system, etc.), a projector, an automated teller machine (ATM), and so on. In some instances, the user device 500 may be a mobile device.

The user device 500 may include one or more processors 502, memory 504, one or more communication interfaces 506, and one or more displays 508. The one or more processors 502 may include a central processing unit (CPU), a graphics processing unit (GPU), a microprocessor, a digital signal processor, and so on. The one or more displays 508 may include a touch screen, a Liquid-crystal Display (LCD), a Light-emitting Diode (LED) display, an organic LED display, a plasma display, an electronic paper display, or any other type of technology. Although not illustrated, the user device 500 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The user device 500 may additionally include, or be associated with, input device(s) such as a keyboard, a mouse, a pen, a voice input device, a touch input device, etc. The memory 504 may include a customer module 510 and a location module 512.

The customer module 510 may provide functionality to enable a user to order an item and/or process a transaction for the item. The customer module 510 may provide various interfaces and/or dashboards. For example, the customer module 510 may enable a user to order an item and provide instructions regarding an item that may potentially be unavailable. Additionally, or alternatively, the customer module 510 may enable the user to provide payment for an item (e.g., via a card reader, NFC connection to a merchant device, Bluetooth® connection to a merchant device, etc.), receive receipts for items, and so on. Further, the customer module 510 may enable the user to check in to a merchant to carry out a card-less payment transaction. Moreover, the customer module 510 may provide a variety of other functionality to order an item and/or process a transaction.

The location module 512 may determine a location of the user device 500. In some instances, the location is provided to the service provider 102, or used locally, to facilitate various functions, such as processing of transactions when a customer is located within a particular proximity to a merchant device. The location module 512 may determine a geographic location of the user device 500 from geolocation techniques (e.g., satellite-based systems—global positioning system (GPS)), cell tower location data, wireless access point location data, wireless beacon location, and so forth. As such, the location module 512 may utilize data from a location sensor of the user device 500, such as a GPS receiver or communication interface that can determine (e.g., from cell towers or wireless access points) a geographic location of the user device 500.

Figure 6:
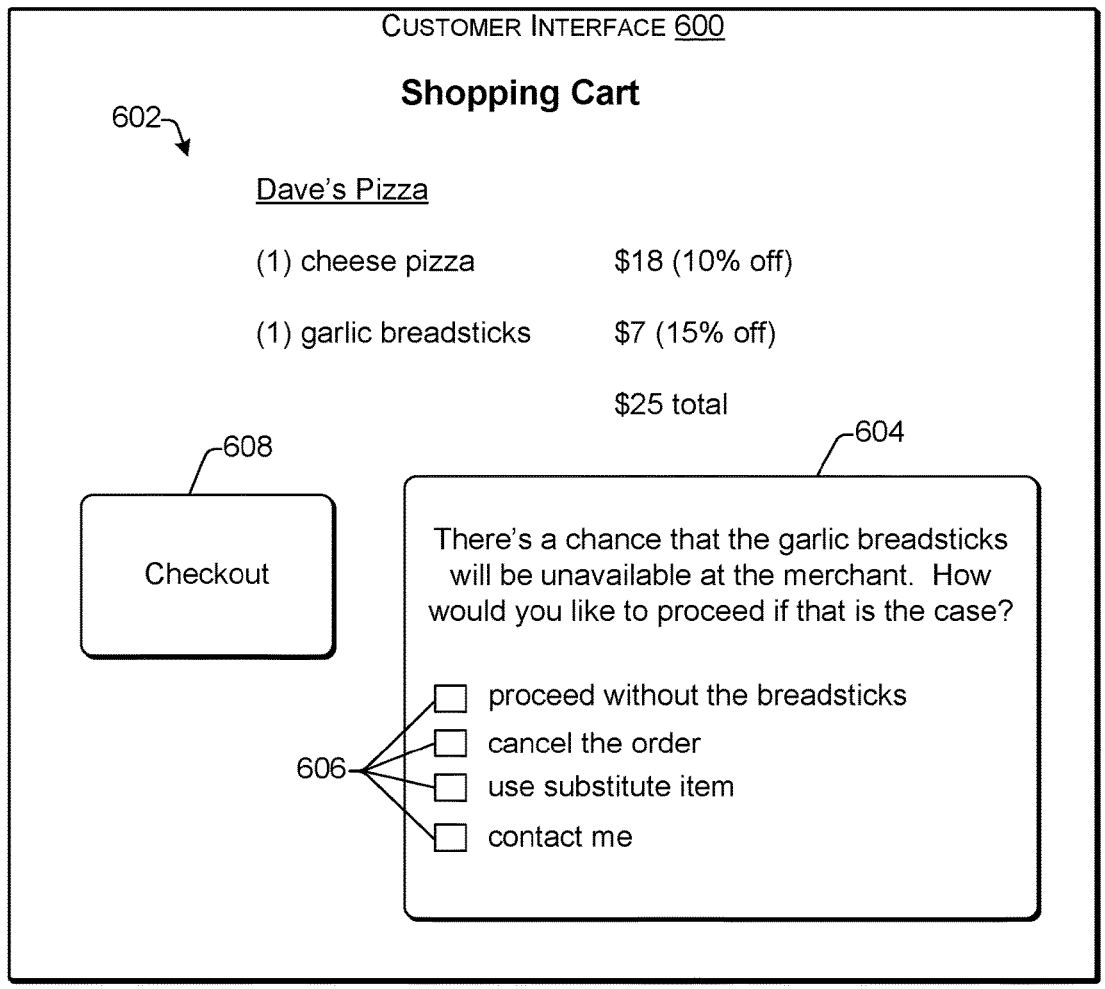
FIG. 6 illustrates an example customer interface to prompt a user for instructions on how to proceed with a potentially unavailable item.

FIG. 6 illustrates an example customer interface 600 to prompt a user for instructions on how to proceed with a potentially unavailable item. The customer interface 600 may be displayed on a user device via an application (e.g., mobile application, desktop application, etc.), web browser (e.g., for an online site), etc. Here, the customer interface 600 includes a shopping cart screen with information 602 regarding items that have been placed in an online shopping cart. In this example, the service provider 102 has determined that the breadsticks are likely to be unavailable when the item is being fulfilled at Dave's Pizza (e.g., there is a threshold amount of risk of the breadsticks being unavailable). As such, a notification 604 is displayed requesting the user for information on how to proceed if the breadsticks are unavailable. As illustrated, options 606 may be presented for selection by the user. Upon making a selection, the user may proceed with the checkout by selecting a checkout button 608.

Although the notification 604 is displayed in FIG. 6 in the context of an online shopping cart, the notification 604 may be displayed in other contexts, such as at a checkout stage when items are being purchased, as the item is being placed in the shopping cart, right after the item has been purchased, and so on.

Figure 7A:
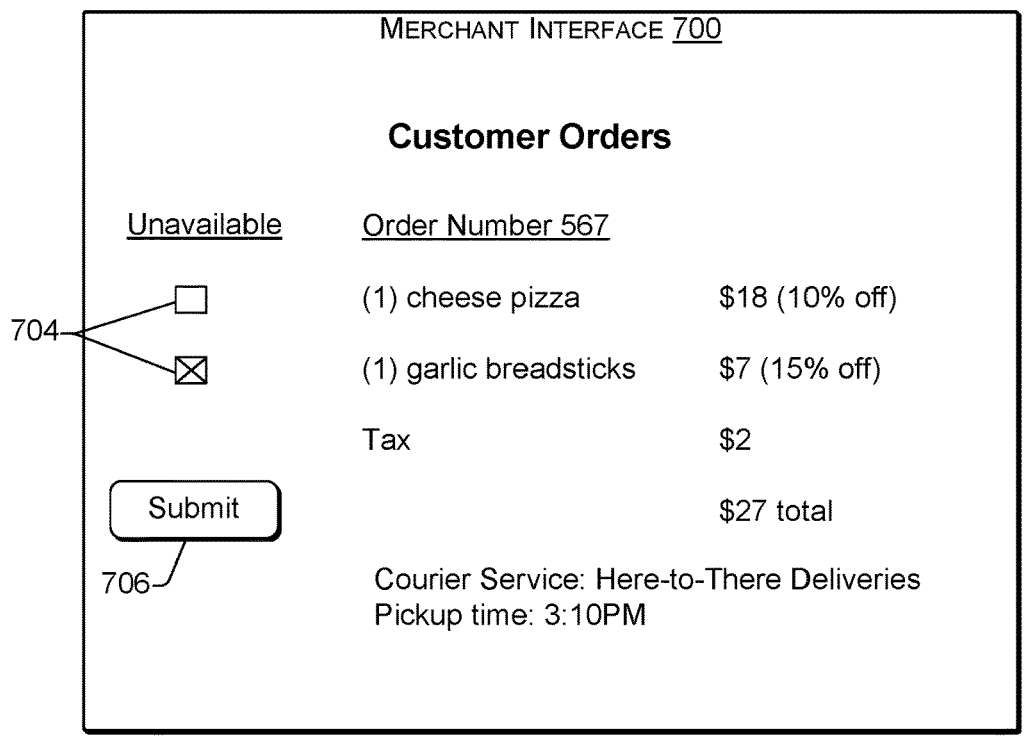
FIGS. 7A and 7B illustrate example merchant interfaces to receive information from a merchant regarding an availability of an item and inform the merchant of a user's instructions for proceeding with an order.
Figure 7B:
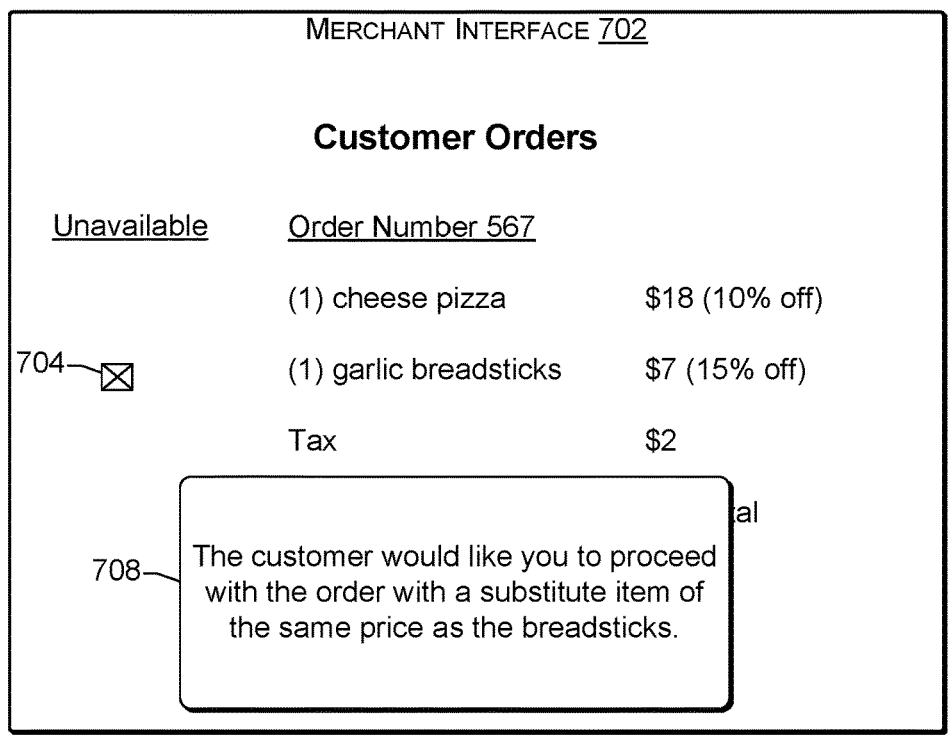

FIGS. 7A and 7B illustrate example merchant interfaces 700 and 702 to receive information from a merchant regarding an availability of an item and inform the merchant of a user's instructions for proceeding with an order. The merchant interfaces 700 and 702 may be displayed on a merchant device via an application (e.g., mobile application, desktop application, etc.), web browser (e.g., for an online site), etc.

FIG. 7A illustrates the example merchant interface 700 to provide various information regarding an order that has been placed with a merchant. For example, the merchant may view items that are ordered by a customer, information identifying a courier service to deliver the item (or name of a courier), and a pickup time for the delivery. Further, the merchant interface 700 may enable the merchant to select items that are unavailable for fulfillment. The merchant may select one or more of options 704 indicating whether or not an item is available. Here, the merchant has indicated that the breadsticks are unavailable (e.g., the merchant is out of the specific dough for the breadsticks) and has sent such indication to the service provider 102 by selecting a submit button 706.

Thereafter, the merchant interface 702 may inform the merchant of the customer's choice for proceeding with the order, as illustrated in FIG. 7B. Here, a notification 708 may be displayed in response to the merchant selecting the submit button 706 in FIG. 7A. The notification 708 is based on instructions that are stored at the service provider 102. In this example, the customer would like to substitute the breadsticks with an item of the same price. In some instances, the service provider 102 determines the substitute item to use based on items of the merchant that are frequently (e.g., more than a threshold number of times) purchased by other buyers, reviews of items sold by the merchant, a price of the breadsticks, a category of the breadsticks, and so on. As such, the substitute item may be an item that is relatively popular, within a same price range at the breadsticks, in a same category as the breadsticks (e.g., appetizers, etc.), and so on. In other instances, the merchant may determine the substitute item (e.g., chefs choice). In any event, the merchant may proceed with the order with a substitute item. Although not illustrated, in some examples the merchant may specify the item being used as a substitute and submit the information to the service provider 102, so that the customer may be informed of the change.

FIGS. 8-13 illustrate example processes 800, 900, 1000, 1100, 1200, and 1300 for employing the techniques described herein. For ease of illustration the processes 800, 900, 1000, 1100, 1200, and 1300 may be described as being performed by a computing device described herein, such as the service provider 102, the merchant device 300, the courier device 400, and/or the user device 500. However, the processes 800, 900, 1000, 1100, 1200, and 1300 may be performed by other devices. Moreover, the devices may be used to perform other processes.

The processes 800, 900, 1000, 1100, 1200, and 1300 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be omitted.

Figure 8A:
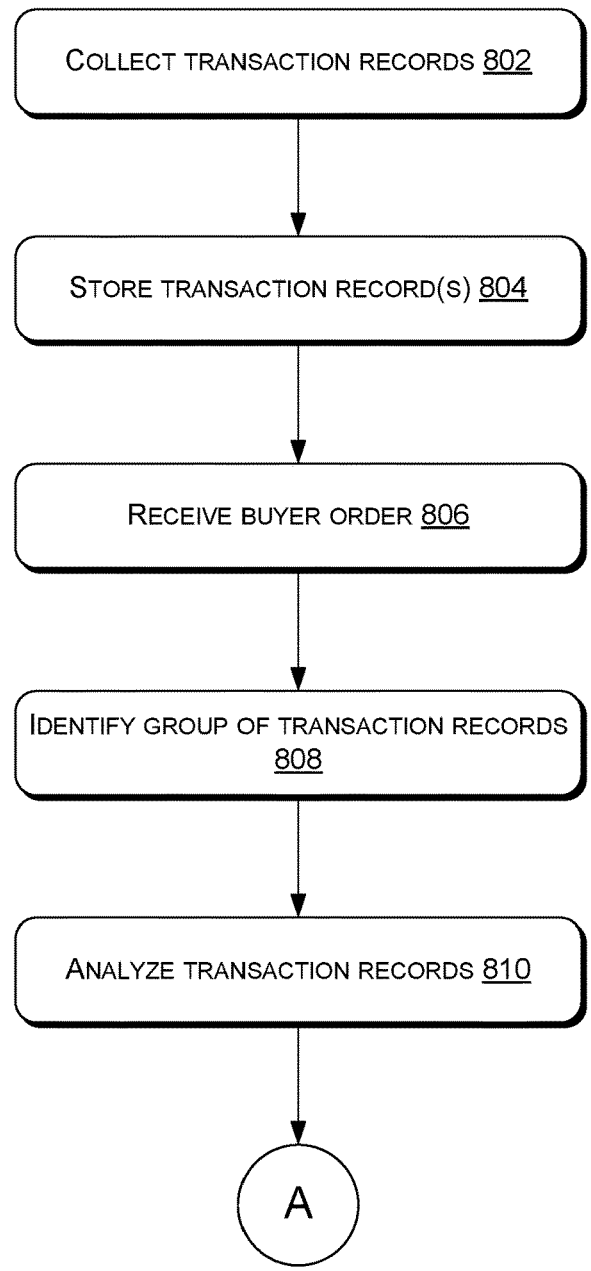
FIGS. 8A and 8B illustrates an example process to perform various processing and providing notifications for potentially missing items of an order.
Figure 8B:
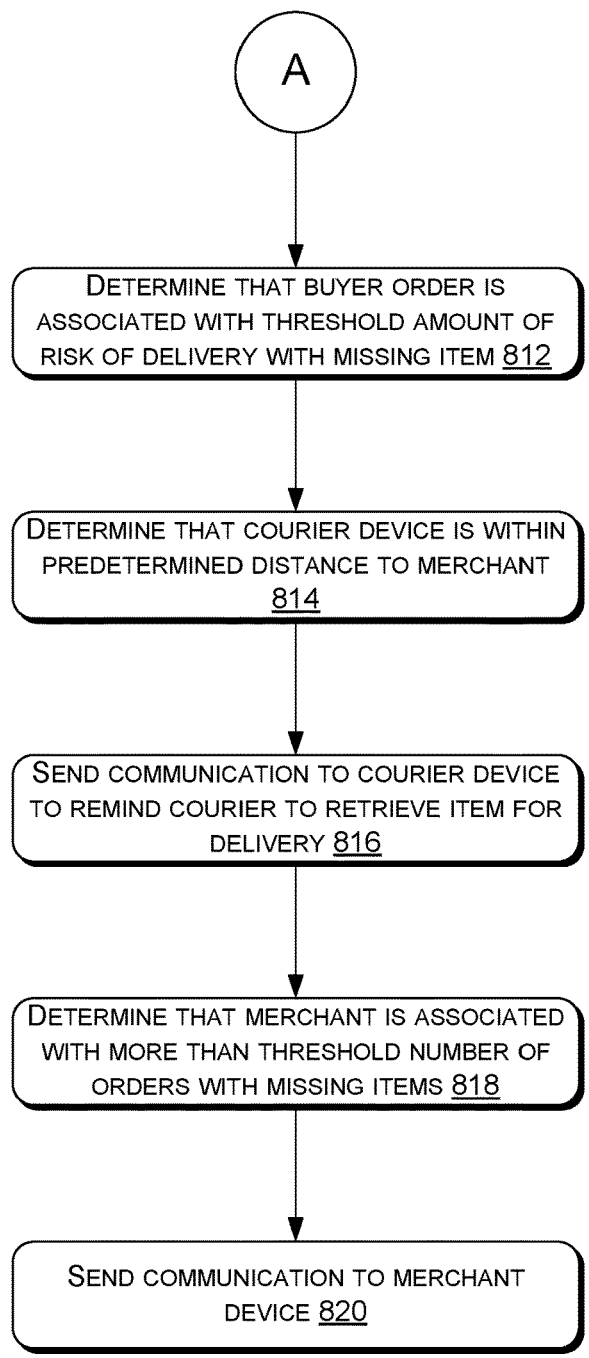

FIGS. 8A and 8B illustrates the example process 800 to perform various processing and providing notifications for potentially missing items of an order. For ease of illustration, the process 800 will be discussed in the context of a service computing device (e.g., the service computing device of the service provider 102 of FIG. 1). Although the process 800 may be performed by other devices.

In FIG. 8A, at 802 the service computing device may collect (or receive) a plurality of transaction records regarding orders that have been previously delivered with missing items (e.g., orders that have been delivered without items that were ordered). A transaction record may indicate that an item was delivered due to non-delivery of the item in a previous order (e.g., an additional order was placed), indicate that a refund was issued for one or more items due to non-delivery of the one or more items, and so on. Additionally, or alternatively, a transaction record may indicate that a discussion was held between a customer and a customer service agent regarding an order that was previously delivered with a missing item.

At 804, the service computing device may store the plurality of transaction records in a data store. The plurality of transaction records may be stored as the records are collected over time from merchants, couriers, buyers, and so on.

At 806, the service computing device may receive a buyer order for an item offered for acquisition by a merchant. The buyer order may be received from a buyer device associated with a buyer to acquire the item (e.g., purchase the item from the merchant).

At 808, the service computing device may identify a group of transaction records, from among the plurality of transaction records stored in the data store, that are related to a particular courier or a particular merchant. For example, the group of transaction records may include transaction records for orders that have been delivered by the same courier that is assigned to deliver the buyer order. Additionally, or alternatively, the group of transactions records may include transaction records for orders that have been fulfilled by the same merchant that is fulfilling the buyer order.

At 810, the service computing device may analyze one or more of the plurality of transaction records that are stored in the data store. For example, the service computing device may analyze the group of transaction records or other groups of transaction records. The analysis may identify a characteristic of orders that have been previously delivered with missing items. The characteristic may include a category of a missing item, a time of day of delivery, a time of the week of delivery, a price of a missing item, a quantity of items in an order, a price of an order, and so on. Additionally, or alternatively, the analysis may identify a pattern of orders that have been previously delivered with missing items. The pattern may indicate that more than a threshold number of the orders are associated with more than a particular price (e.g., more than 50 dollars), more than a threshold number of the orders are associated with more than a particular quantity of items (e.g. more than 12 items in a order), more than a threshold number of the orders are fulfilled by a particular merchant (e.g., Dave's pizza frequently misses salads, Ron's Burgers frequently misses soda drinks, etc.), more than a threshold number of the orders are delivered by a particular courier (e.g., John frequently misses salad dressing, etc.), more than a threshold number of the orders are associated with a particular item category (e.g., appetizers are frequently missed), more than a threshold number of the orders are delivered within a particular period of time during the day (e.g., after lunch, after dinner, etc.), more than a threshold number of the orders are delivered on a particular day of the week (e.g., Friday, Saturday, etc.).

In FIG. 8B, at 812, the service computing device may determine that the buyer order is associated with more than a threshold amount of risk of being delivered without the item. The determination may be based on a characteristic (or pattern) of orders that have been previously delivered with missing items. For example, operation 812 may include determining that a price of the buyer order is more than a particular price, determining that a quantity of items of the buyer order is more than a particular quantity of items, determining that the buyer order is being fulfilled by a particular merchant (e.g., the merchant that is fulfilling the buyer order), determining that the buyer order is being delivered by a particular courier (e.g., the courier that is delivering the buyer order), determining that the buyer order includes an item that is associated with a particular item category, determining that the buyer order is being delivered within a particular period of time during the day, determining that the buyer order is being delivered on a particular day of the week, and so on.

At 814, the service computing device may determine that a courier device associated with the courier that is assigned to deliver the buyer order is within a predetermined distance to the merchant of the buyer order. The determination may be based on a geographic location of the courier device and a geographic location of a merchant device of the merchant.

At 816, the service computing device may send a reminder communication to a courier device associated with the courier that is assigned to deliver the buyer order. The communication may include information to remind the courier to retrieve the item of the buyer order from the merchant for delivery to the buyer. The communication may be sent in response to performing the determination of operation 814 or at other times.

At 818, the service computing device may determine that the merchant of the buyer order is associated with more than a threshold number of orders that have been previously fulfilled with missing items. That is, the service computing device may determine that the merchant has a history of missing items when fulfilling orders.

At 820, the service computing device may send a communication to the merchant device of the buyer order. The communication may include information to remind the merchant to include an item that has been ordered.

Figure 9:
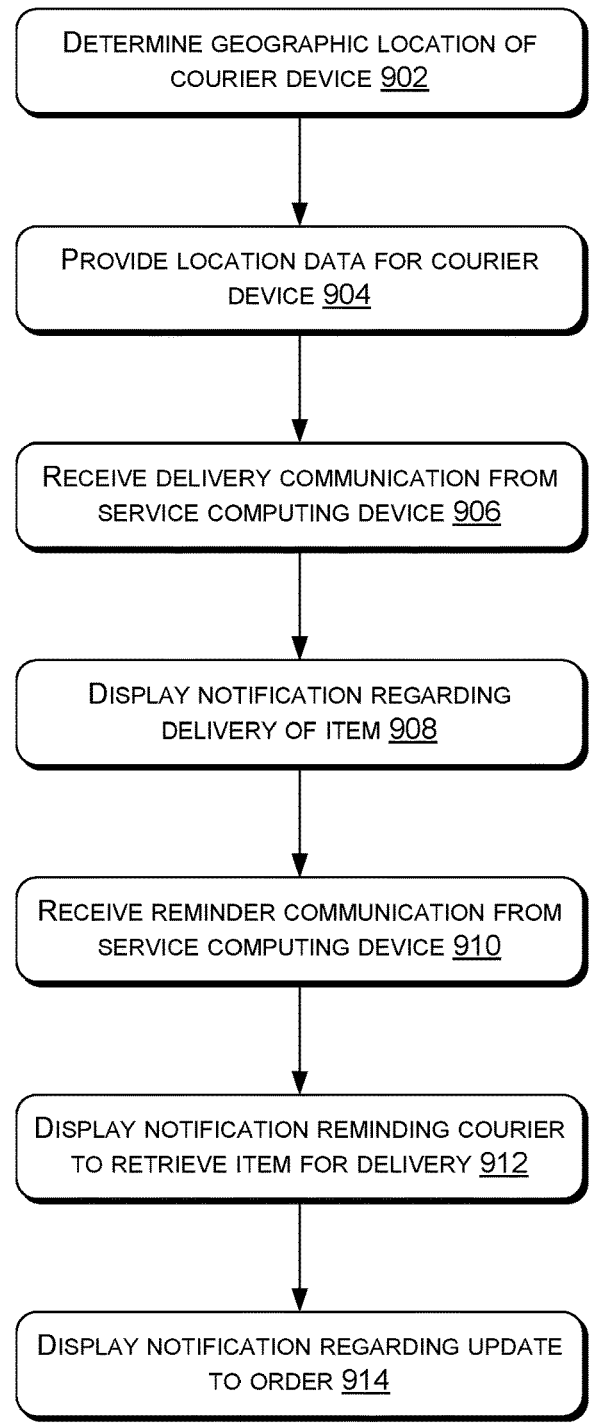
FIG. 9 illustrates an example process to inform a courier of a delivery for a buyer order and provide other information regarding potentially missing or unavailable items.

FIG. 9 illustrates the example process 900 to inform a courier of a delivery for a buyer order and provide other information regarding potentially missing or unavailable items. For ease of illustration, the process 900 will be discussed in the context of a courier device (e.g., the courier device 400 of FIG. 4). Although the process 900 may be performed by other devices.

At 902, the courier device may determine a geographic location of the courier device based on data from a location sensor.

At 904, the courier device may provide location data for the courier device to a service computing device. The location data may indicate the geographic location of the courier device. The location data may be updated over time as the courier device changes location.

At 906, the courier device may receive a delivery communication from the service computing device. The delivery communication may include information regarding a delivery for a buyer order.

At 908, the courier device may display a notification regarding delivery of an item to a buyer. The notification may display information regarding where to pick-up the item, where to deliver the item, a pick-up time, a drop-off time, a list of items to pick-up, and so on.

At 910, the courier device may receive a reminder communication from the service computing device. The reminder communication may include information to remind the courier to retrieve an ordered item from a merchant for delivery.

At 912, the courier device may display a notification regarding a potentially missing item. The notification may remind the courier to retrieve an ordered item from a merchant for delivery to a buyer (e.g., check for a particular item that may be missing). The notification may be based on the reminder communication, such as displayed in response to receiving the reminder communication, based on information in the reminder communication, and so on.

At 914, the courier device may display a notification regarding an update to an order. The notification may indicate an update to an order due to an unavailability of an item at a merchant.

Figure 10A:
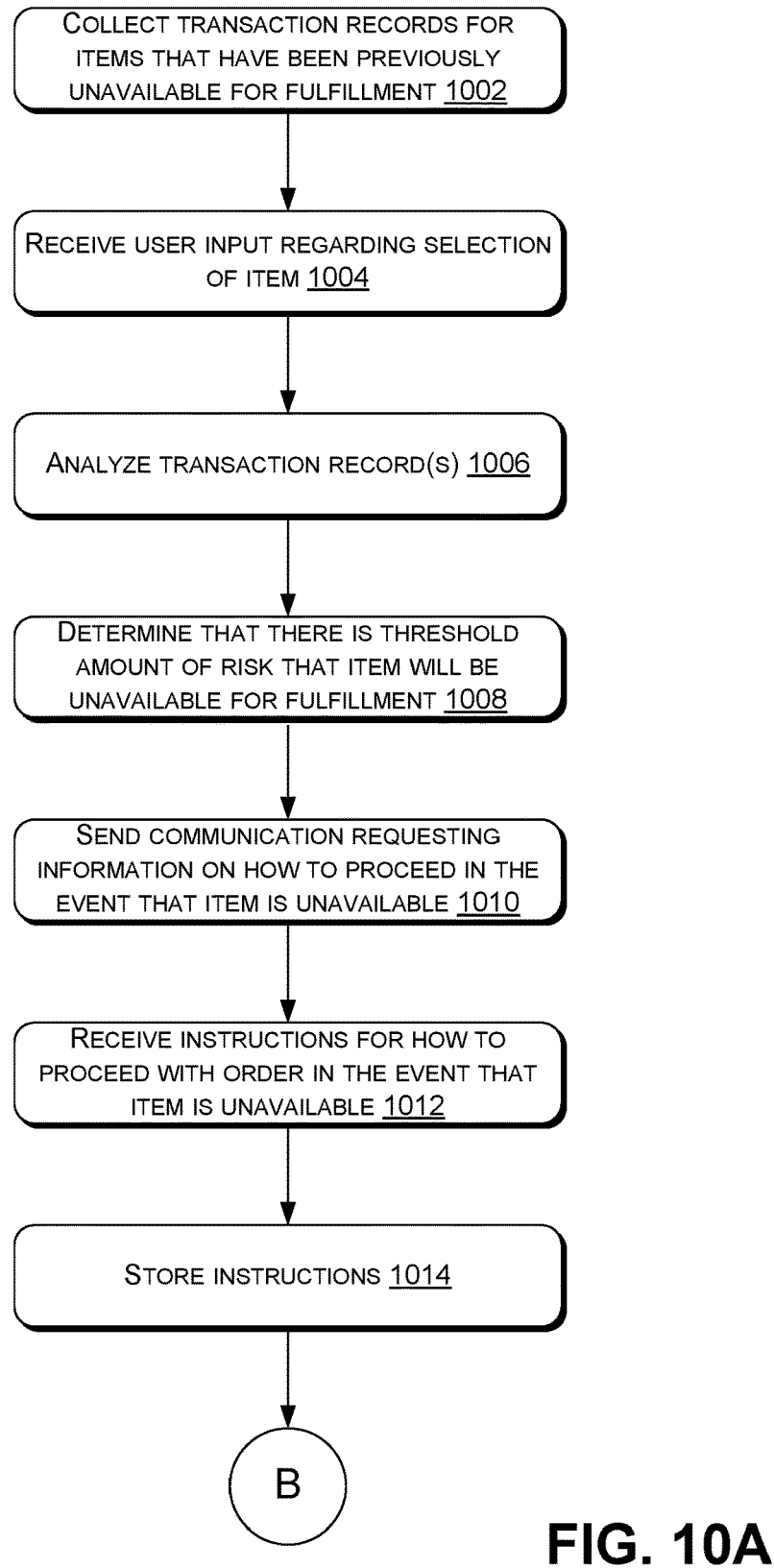
FIGS. 10A and 10B illustrate an example process to perform processing and providing notifications for potentially unavailable items of an order.
Figure 10B:
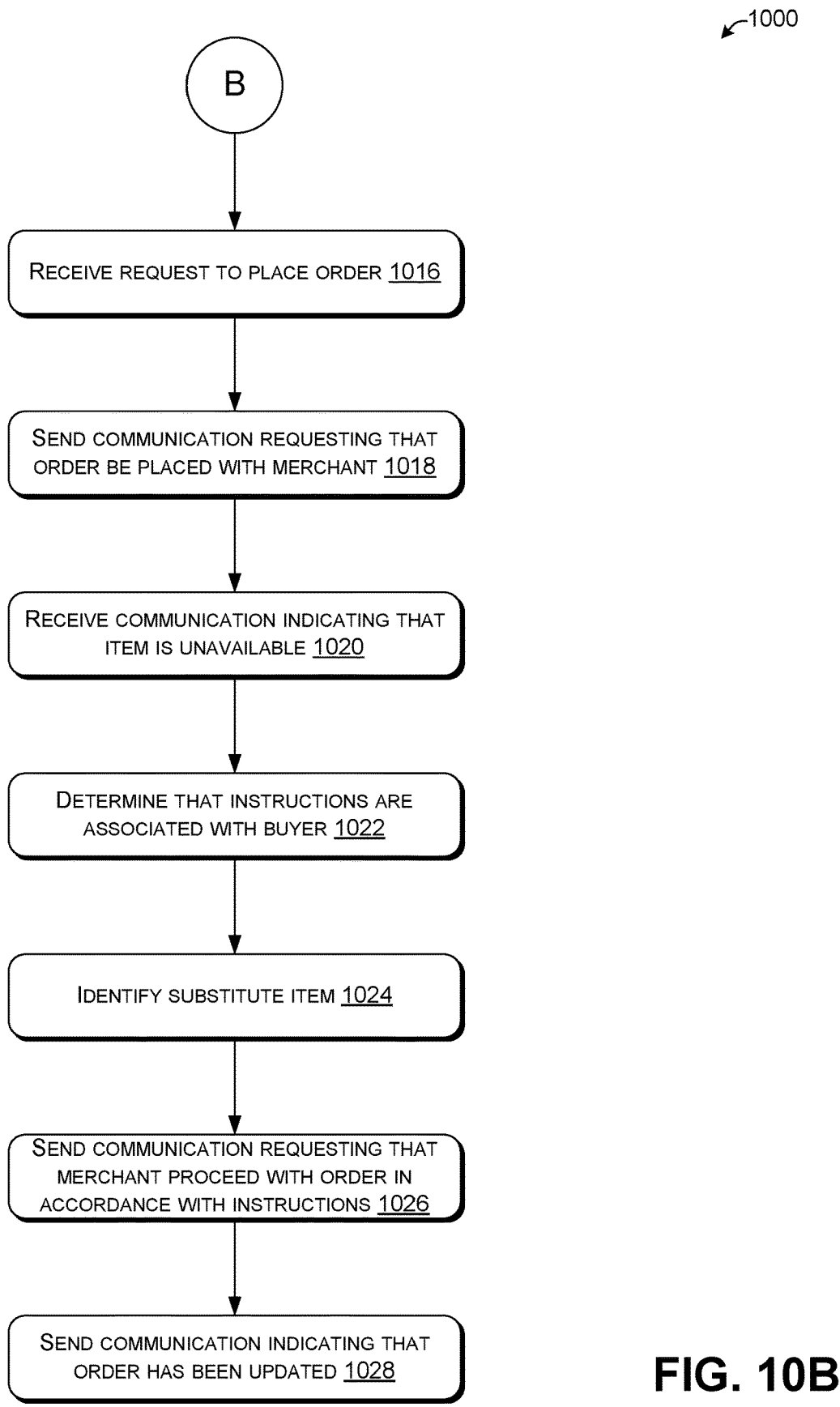

FIGS. 10A and 10B illustrate the example process 1000 to performing processing and providing notifications for potentially unavailable items of an order. For ease of illustration, the process 1000 will be discussed in the context of a service computing device (e.g., the service computing device of the service provider 102 of FIG. 1). Although the process 1000 may be performed by other devices.

In FIG. 10A, at 1002 the service computing device may collect a plurality of transaction records regarding items that have been previously unavailable for fulfillment of orders. A transaction record may indicate that a particular item has been used as a substitute for an item that was ordered, indicate that a particular item was marked by a merchant as unavailable for fulfillment of a previous order, and so on.

At 1004, the service computing device may receive user input regarding selection of an item to place an order with a merchant. The user input may place an item in an online shopping cart to order the item from the merchant.

At 1006, the service computing device may analyze one or more of the plurality of transaction records. The analysis may identify items of a merchant that are unavailable more than a threshold number of times (e.g., buffalo wings are frequently unavailable, breadsticks are frequently unavailable, etc.), determine when the items are unavailable (e.g., buffalo wings are frequently unavailable on Thursdays, breadsticks are frequently unavailable after lunch, etc.), determine a merchant that is associated with unavailable items more than a threshold number of times (e.g., Dave's Pizza frequently does not have breadsticks), and so on.

At 1008, the service computing device may determine (e.g., predict) that there is more than a threshold amount of risk that an item will be unavailable for fulfillment of a current order. The determination may be based on a time of day when the order is placed (e.g., determine a relatively high level of risk if the order is placed after lunch when the item is frequently unavailable), a day of the week when the order is placed (e.g., determine a relatively high level of risk if the order is placed at the end of the week when items are frequently unavailable), a frequency of the item being unavailable for fulfillment by the merchant or another merchant (e.g., determine a relatively high level of risk if the order includes an item that is frequently unavailable by the same merchant that is fulfilling the current order), a frequency of the merchant being unable to fulfill order (e.g., determine a relatively high level of risk if the order is placed with a merchant that is frequently unable to fulfill orders due to unavailability of a variety of items), a rate at which the item is being purchased (e.g., determine a relatively high level of risk if the item is being sold at a merchant's location at a relatively high rate), a current inventory of the item at the merchant (e.g., determine a relatively high level of risk if the merchant's current inventory is relatively low), hours of operation of a merchant (e.g., determine a relatively high level of risk if the order is placed close to closing time), etc.

At 1010, the service computing device may send a communication to a buyer device requesting information on how to proceed with the order in the event that the item is unavailable at the merchant. The operation 1010 may be performed in response to the determination at 1008 or at other times.

At 1012, the service computing device may receive, from the buyer device, instructions for how to proceed with the order in the event that the item is unavailable at the merchant. The instructions may request that the order be canceled, the merchant proceed with the order without the item, a substitute item be used, the buyer be contacted (e.g., through email, text, or a customer service agent to resolve the issue), and so on.

At 1014, the service computing device may store the instructions in association to the buyer. The instructions may be used for proceeding the current order and/or an additional order that may be placed at a later time (e.g., stored as a user preference).

In FIG. 10B, at 1016 the service computing device may receive, from the buyer device, a request to place the order with the merchant.

At 1018, the service computing device may send a communication to the merchant requesting that the order be placed with the merchant. The communication may be sent in response to receiving the request to place the order at 1016 or at other times.

At 1020, the service computing device may receive a communication from the merchant indicating that the item is unavailable (e.g., an ordered item is out-of-stock or otherwise unavailable for fulfillment by the merchant). In some instances, the communication may also identify a particular substitute item (e.g., an item the merchant recommends).

At 1022, the service computing device may determine that the buyer of the order is associated with instructions for proceeding in the event that an item is unavailable for fulfillment.

In some instances, such as in cases when the instructions request that a substitute item be used, the service computing device may, at 1024, determine a substitute item to be used. This may include using a recommendation from a merchant or performing additional processing to determine a substitute item. For example, the service computing device may determine a substitute item based on items of the merchant that are purchased by other buyers (e.g., identify a substitute item that is selling relatively well for a particular merchant), reviews/ratings of items offered by the merchant or other merchants (e.g., identify a substitute item that has relatively positive reviews/ratings), a price of the item (e.g., identify a similarly priced substitute item), a category of the item (e.g., identify a substitute item from a same category), and so on.

At 1026, the service computing device may send a communication to the merchant requesting that the merchant proceed with fulfilling the order in accordance with the instructions. This may include instructing the merchant to cancel an order, proceed without an unavailable item (and refund the price of the unavailable item), use a substitute item, and so on. In some instances, the communication may identify the substitute item to use, in other instances the merchant may identify the substitute item.

At 1028, the service computing device may send a communication to the buyer indicating that the order has been updated according to the instructions.

Figure 11:
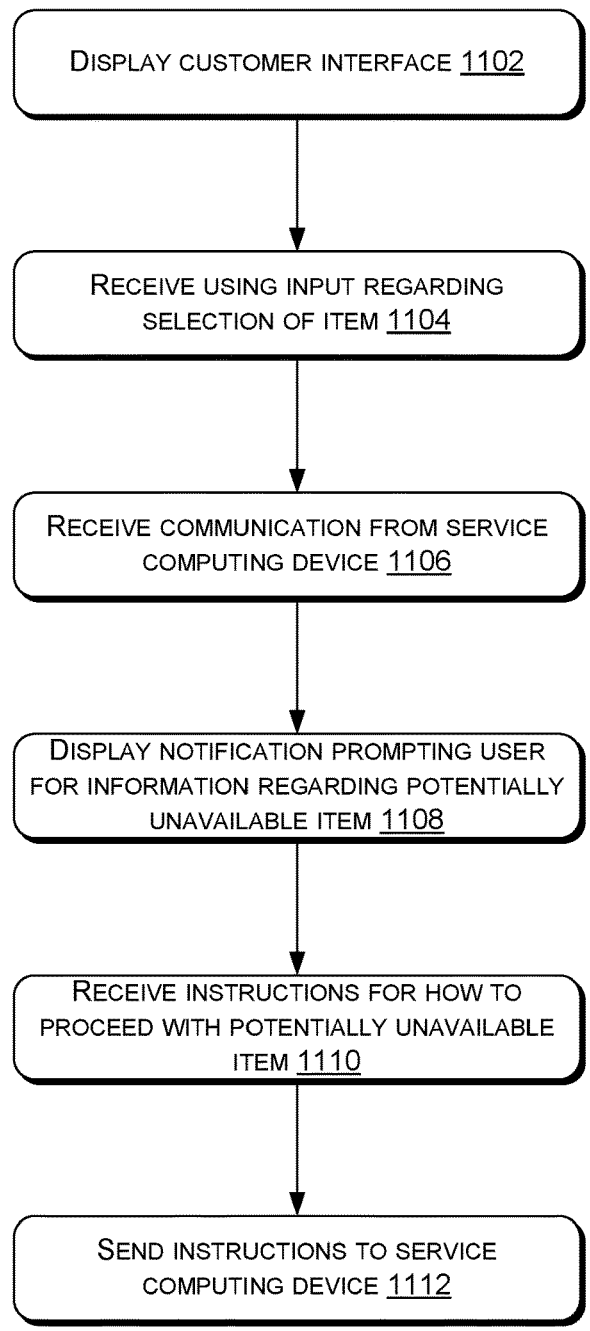
FIG. 11 illustrates an example process to receive instructions for how to proceed with an order in the event that an item of the order is unavailable.

FIG. 11 illustrates the example process 1100 to receive instructions for how to proceed with an order in the event that an item of the order is unavailable. For ease of illustration, the process 1100 will be discussed in the context of a user device (e.g., the user device 500 of FIG. 5). Although the process 1100 may be performed by other devices.

At 1102, the user device may display a customer interface to enable a user to place an order. For example, the customer interface may display a catalog of items that are offered by one or more merchants for acquisition (e.g., items of multiple merchants for delivery by a courier service). Further, upon selecting an item for purchase, the customer interface may display an online shopping cart of items. In addition, the customer interface may enable the buyer to proceed with placing an order by displaying various other information (e.g., a checkout page, confirmation page, etc.).

At 1104, the user device may receive, via the customer interface, user input regarding selection of an item for placing an order (e.g., placement of the item in an online shopping cart).

At 1106, the user device may receive a communication from the service computing device. The communication may include data for requesting information on how to proceed with the order in the event that the item is unavailable at a merchant.

At 1108, the user device may display a notification, via the customer interface, prompting the user for information on how to proceed with the order in the event that an item is unavailable for fulfillment. The notification may be displayed in response to receiving the communication from the service computing device.

At 1110, the user device may receive, via the customer interface, instructions for how to proceed with the order in the event that the item is unavailable for fulfillment. The user may select an option that is displayed, provide text/voice input, and so on.

At 1112, the user device may send the instructions to the service computing device.

Figure 12:
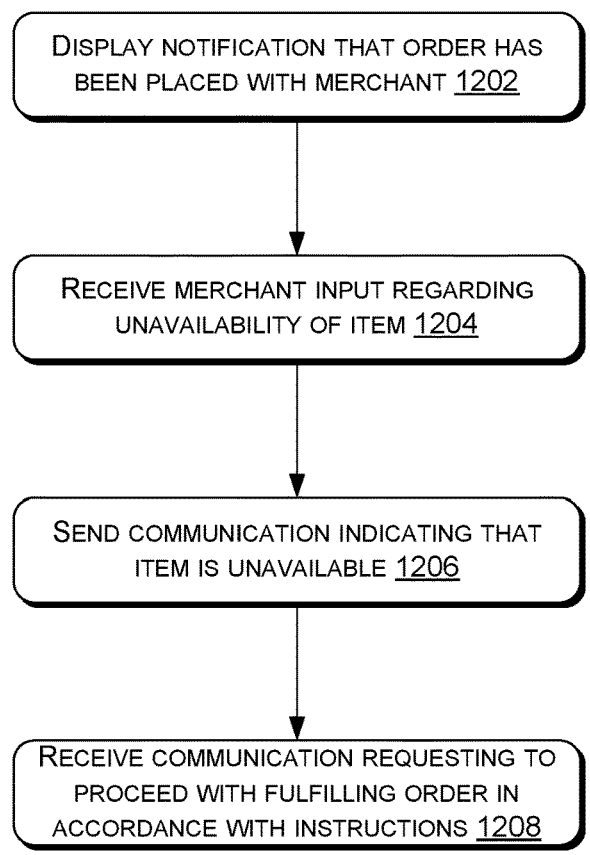
FIG. 12 illustrates an example process to provide input indicating that an item of an order is unavailable for fulfillment.

FIG. 12 illustrates the example process 1200 to provide input indicating that an item of an order is unavailable for fulfillment. For ease of illustration, the process 1200 will be discussed in the context of a merchant device (e.g., the merchant device 300 of FIG. 3). Although the process 1200 may be performed by other devices.

At 1202, the merchant device may display, via a merchant interface, a notification that an order has been placed with the merchant. This may inform the merchant of the order so that the order can be prepared by the merchant.

At 1204, the merchant device may receive, via the merchant interface, input indicating that an item of the order is unavailable. The input may also identify a substitute item to be used in place of the unavailable item.

At 1206, the merchant device may send a communication to the service computing device indicating that the item is unavailable. The communication may also identify a substitute item recommended by the merchant.

At 1208, the merchant device may receive a communication from the service computing device requesting that the merchant proceed with fulfilling the order in accordance with instructions from a buyer (e.g., proceed without the unavailable item, cancel the order, contact the buyer, proceed with substitute item, etc.). A notification may be displayed, via the merchant interface, regarding how to proceed.

Figure 13:
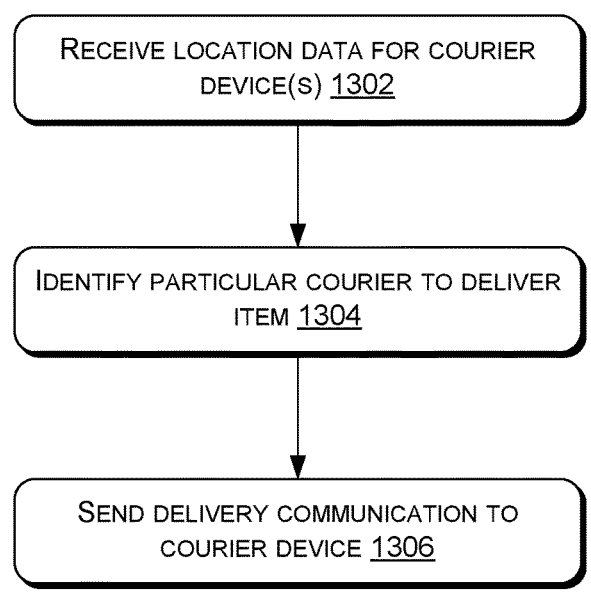
FIG. 13 illustrates an example process to inform a courier about a delivery of an order.

FIG. 13 illustrates the example process 1300 to inform a courier about a delivery of an order. For ease of illustration, the process 1300 will be discussed in the context of a service computing device (e.g., the service computing device of the service provider 102 of FIG. 1). Although the process 1300 may be performed by other devices.

At 1302, the service computing device may receive location data for a plurality of courier devices. The service computing device may monitor locations of the plurality of courier devices over time.

At 1304, the service computing device may identify a particular courier to deliver an item to a buyer. The operation 1404 may be based on the location data for individual ones of the plurality of courier devices. The operation 1404 may be based on a proximity of the courier to a buyer and/or a merchant.

At 1306, the service computing device may send a delivery communication to a courier device associated with the particular courier. The delivery communication may include information to request that the particular courier retrieve the item from a merchant and deliver the item to a buyer. The delivery request may, in some instances, be sent over a wireless connection.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:
  a service computing device including one or more service computing device processors and a service computing device communication interface communicatively coupled to the one or more service computing device processors for communicating over one or more networks with a plurality of courier devices, the service computing device being configured to:
    receive a plurality of transaction records for a plurality of delivered past orders that were previously delivered to respective buyers and for which at least one item was missing from respective ones of the delivered past orders;
    store the plurality of transaction records in a data store;
    receive location data for individual ones of the plurality of courier devices;
    receive, from a buyer device associated with a buyer, a buyer order for an item offered for acquisition by a merchant;
    based at least in part on the location data for individual ones of the plurality of courier devices, determine a courier to deliver the item to the buyer, the courier associated with a first courier device of the plurality of courier devices;
    send, at least partly over a wireless connection, a delivery communication to the first courier device, the delivery communication requesting that the courier retrieve the item from the merchant and deliver the item to the buyer;
    identify a group of transaction records, from among the plurality of transaction records stored in the data store, that are related to at least one of the courier or the merchant;
    determine, based on analysis of the group of transaction records, a characteristic of the delivered past orders that were previously delivered and for which at least one item was missing from the respective delivered past orders, the characteristic comprising at least one of a category of an item that was not delivered, a time of day of delivery, a time of the week of delivery, a price of an item that was not delivered, a quantity of items in an order, or a price of an order;
    based at least in part on the characteristic, determine that the buyer order is associated with more than a threshold amount of risk of being delivered without the item;
    determine that a geographic location of the first courier device is within a predetermined distance to a geographic location of the merchant; and
    in response to determining that the geographic location of the first courier device is within the predetermined distance to the geographic location of the merchant, send a reminder communication to the first courier device to remind the courier to retrieve the item from the merchant for delivery to the buyer, the reminder communication, causing the first courier device to present a notification to remind the courier to retrieve the item from the merchant for delivery to the buyer.

2. The system of claim 1, wherein the service computing device is further configured to:
  determine that the courier is associated with more than a threshold number of the past orders that were delivered to respective buyers with an ordered item missing; and
  determine that the buyer order is associated with more than the threshold amount of risk of being delivered without the item based at least in part on determining that the courier is associated with more than the threshold number of the past orders that were delivered to respective buyers with an ordered item missing.

3. The system of claim 1, wherein the service computing device is further configured to:
  determine that the merchant is associated with more than a threshold number of the past orders that were delivered to respective buyers with an ordered item missing; and determine that the buyer order is associated with more than the threshold amount of risk of being delivered without the item based at least in part on determining that the merchant is associated with more than the threshold number of the past orders that were delivered to respective buyers with an ordered item missing.

4. The system of claim 1, wherein the service computing device is further configured to:
determine that the merchant is associated with more than a threshold number of the past orders that were delivered to respective buyers with an ordered item missing; and
send a reminder communication to a merchant device associated with the merchant to remind the merchant to include the item with the buyer order.

5. A method comprising:
receiving, by a service computing device, a plurality of transaction records for fulfilled past orders that were previously fulfilled and for which at least one item was missing from respective ones of the fulfilled past orders;
storing, by the service computing device, the plurality of transaction records in a data store;
receiving, from a buyer device associated with a buyer, a buyer order for an item offered by a merchant;
sending, by the service computing device, a delivery request to a courier device associated with a courier, the delivery request requesting that the courier retrieve the item from the merchant and deliver the item to the buyer;
monitoring, by the service computing device, a geographic location of the courier device;
determining, by the service computing device, based on the plurality of transaction records for the fulfilled past orders, a pattern of the past orders that were previously fulfilled and for which at least one item was missing from the respective fulfilled past orders;
based at least in part on the pattern, determining that the buyer order is associated with more than a threshold amount of risk of being delivered without the item of the buyer order; and
based at least on determining that the buyer order is associated with more than the threshold amount of risk of being fulfilled without the item of the buyer order, sending a communication to the courier device to remind the courier to retrieve the item from the merchant for delivery to the buyer.

6. The method of claim 5, wherein:
the pattern indicates that more than a threshold number of the orders are associated with more than a particular price; and
determining that the buyer order is associated with more than a threshold amount of risk of being delivered without the item of the buyer order comprises determining that a price of the buyer order is more than the particular price.

7. The method of claim 5, wherein:
the pattern indicates that more than a threshold number of the orders are associated with more than a particular quantity of items; and
determining that the buyer order is associated with more than a threshold amount of risk of being delivered without the item of the buyer order comprises determining that a quantity of items of the buyer order is more than the particular quantity of items.

8. The method of claim 5, wherein:
the pattern indicates that more than a threshold number of the orders are fulfilled by the merchant; and
determining that the buyer order is associated with more than a threshold amount of risk of being delivered without the item of the buyer order comprises determining that the buyer order is being fulfilled by the merchant.

9. The method of claim 5, wherein:
the pattern indicates that more than a threshold number of the orders are delivered by the courier; and
determining that the buyer order is associated with more than a threshold amount of risk of being delivered without the item of the buyer order comprises determining that the buyer order is being delivered by the courier.

10. The method of claim 5, wherein:
the pattern indicates that more than a threshold number of the orders are associated with a particular item category; and
determining that the buyer order is associated with more than a threshold amount of risk of being delivered without the item of the buyer order comprises determining that the buyer order includes an item that is associated with the particular item category.

11. The method of claim 5, wherein:
the pattern indicates that more than a threshold number of the orders are delivered within a particular period of time during the day; and
determining that the buyer order is associated with more than a threshold amount of risk of being delivered without the item of the buyer order comprises determining that the buyer order is being delivered within the particular period of time during the day.

12. The method of claim 5, wherein:
the pattern indicates that more than a threshold number of the orders are delivered on a particular day of the week; and
determining that the buyer order is associated with more than a threshold amount of risk of being delivered without the item of the buyer order comprises determining that the buyer order is being delivered on the particular day of the week.

13. The method of claim 5, further comprising:
sending a communication to a merchant device associated with the merchant to remind the merchant to include the item in the buyer order.

14. One or more non-transitory computer-readable media storing executable instructions that, when executed by one or more processors, cause the one or more processors to perform operations comprising:
receiving a plurality of transaction records for fulfilled past orders that were previously fulfilled and for which at least one item was missing from respective ones of the fulfilled past orders;
receiving, from a buyer device associated with a buyer, a buyer order;
monitoring a geographic location of a courier device that is associated with a courier handling delivery of the buyer order;
determining, based on the plurality of transaction records for the past orders, a pattern of the fulfilled past orders that were previously fulfilled and for which at least one item was missing from the respective fulfilled past orders;
based at least in part on the pattern, determining that the buyer order is associated with more than a threshold amount of risk of being fulfilled without inclusion of at least one item of the buyer order;

determining that the geographic location of the courier device is within a predetermined distance to a geographic location of a merchant associated with fulfilling the buyer order; and based at least in part on determining that the buyer order is associated with more than the threshold amount of risk of being fulfilled without inclusion of at least one item of the buyer order and determining that the geographic location of the courier device is within the predetermined distance to the geographic location of the merchant, sending a communication to the courier device to request that the courier check the buyer order when obtaining the buyer order from the merchant.

15. The one or more non-transitory computer-readable media of claim 14, wherein individual ones of the plurality of transaction records indicate that a refund was issued for one or more items due to non-delivery of the one or more items.

16. The one or more non-transitory computer-readable media of claim 14, wherein individual ones of the plurality of transaction records indicate that an item was delivered due to non-delivery of the item in a previous order.

17. The one or more non-transitory computer-readable media of claim 14, wherein individual ones of the plurality of transaction records indicate that a discussion was held between a customer and a customer service agent regarding an order that was previously delivered with a missing item.

18. The one or more non-transitory computer-readable media of claim 14, wherein the operations further comprise identifying a group of transaction records, from among the plurality of transaction records, that are associated with orders that have been delivered by the courier; and wherein the determining the pattern based on the plurality of transaction records for the past orders comprises analyzing the group of transaction records.

19. The one or more non-transitory computer-readable media of claim 14, wherein the operations further comprise identifying a group of transaction records, from among the plurality of transaction records, that are associated with orders that have been prepared by the merchant; and wherein the determining the pattern based on the plurality of transaction records for the past orders comprises analyzing the group of transaction records.

20. The one or more non-transitory computer-readable media of claim 14, wherein the operations further comprise:

determining that the merchant is associated with more than a threshold number of the orders that have been previously fulfilled with missing items; and sending a communication to a merchant device associated with the merchant to remind the merchant to fulfill the buyer order with an item that has been ordered.

* * * * *